US012621472B2

(12) United States Patent
Shi et al.

(10) Patent No.: US 12,621,472 B2
(45) Date of Patent: May 5, 2026

(54) ENCODING METHOD, DECODING METHOD, AND ELECTRONIC DEVICE

(71) Applicant: Huawei Technologies Co., Ltd., Shenzhen (CN)

(72) Inventors: Yibo Shi, Beijing (CN); Yunying Ge, Beijing (CN); Jing Wang, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 18/820,582

(22) Filed: Aug. 30, 2024

(65) Prior Publication Data

US 2024/0422332 A1 Dec. 19, 2024

Related U.S. Application Data

(63) Continuation of application No. PCT/CN2023/077117, filed on Feb. 20, 2023.

(30) Foreign Application Priority Data

Mar. 7, 2022 (CN) .......................... 202210224692.2

(51) Int. Cl.
*H04N 19/196* (2014.01)
*G06T 9/00* (2006.01)
*H04N 19/159* (2014.01)
*H04N 19/172* (2014.01)

(52) U.S. Cl.
CPC ........... *H04N 19/196* (2014.11); *G06T 9/002* (2013.01); *H04N 19/159* (2014.11); *H04N 19/172* (2014.11)

(58) Field of Classification Search
CPC .. H04N 19/196; H04N 19/159; H04N 19/172; G06T 9/002

USPC .................................................... 375/240.12
See application file for complete search history.

(56) References Cited

U.S. PATENT DOCUMENTS

| | | | |
|---|---|---|---|
| 2019/0014331 A1* | 1/2019 | Li | ........................ H04N 19/196 |
| 2019/0335192 A1 | 10/2019 | Otto et al. | |
| 2021/0127140 A1* | 4/2021 | Hannuksela | ........... H04N 19/59 |
| 2022/0036123 A1* | 2/2022 | Cummings | ............ G06N 20/00 |

FOREIGN PATENT DOCUMENTS

| | | |
|---|---|---|
| WO | 2010144521 A2 | 12/2010 |
| WO | 2020047756 A1 | 3/2020 |

OTHER PUBLICATIONS

Guo Lu, et al., "Content Adaptive and Error Propagation Aware Deep Video Compression", 2020 ECCV Conference, Mar. 25, 2020, 17 pages.
Fabian Mentzer, et al., "Towards Generative Video Compression", arXiv:2107.12038v1 [eess.IV], Jul. 26, 2021, 19 pages.

\* cited by examiner

*Primary Examiner* — Allen C Wong
(74) *Attorney, Agent, or Firm* — Conley Rose, P.C.

(57) ABSTRACT

An encoding method includes obtaining a to-be-encoded frame, where the to-be-encoded frame is a P-frame, determining, from M preset network parameter sets, a network parameter set corresponding to the to-be-encoded frame, where the M preset network parameter sets respectively correspond to different compression performance information, and M is an integer greater than one, and encoding, by an encoding network, and based on the network parameter set corresponding to the to-be-encoded frame, the to-be-encoded frame to obtain a bitstream representative of the to-be-encoded frame.

20 Claims, 19 Drawing Sheets

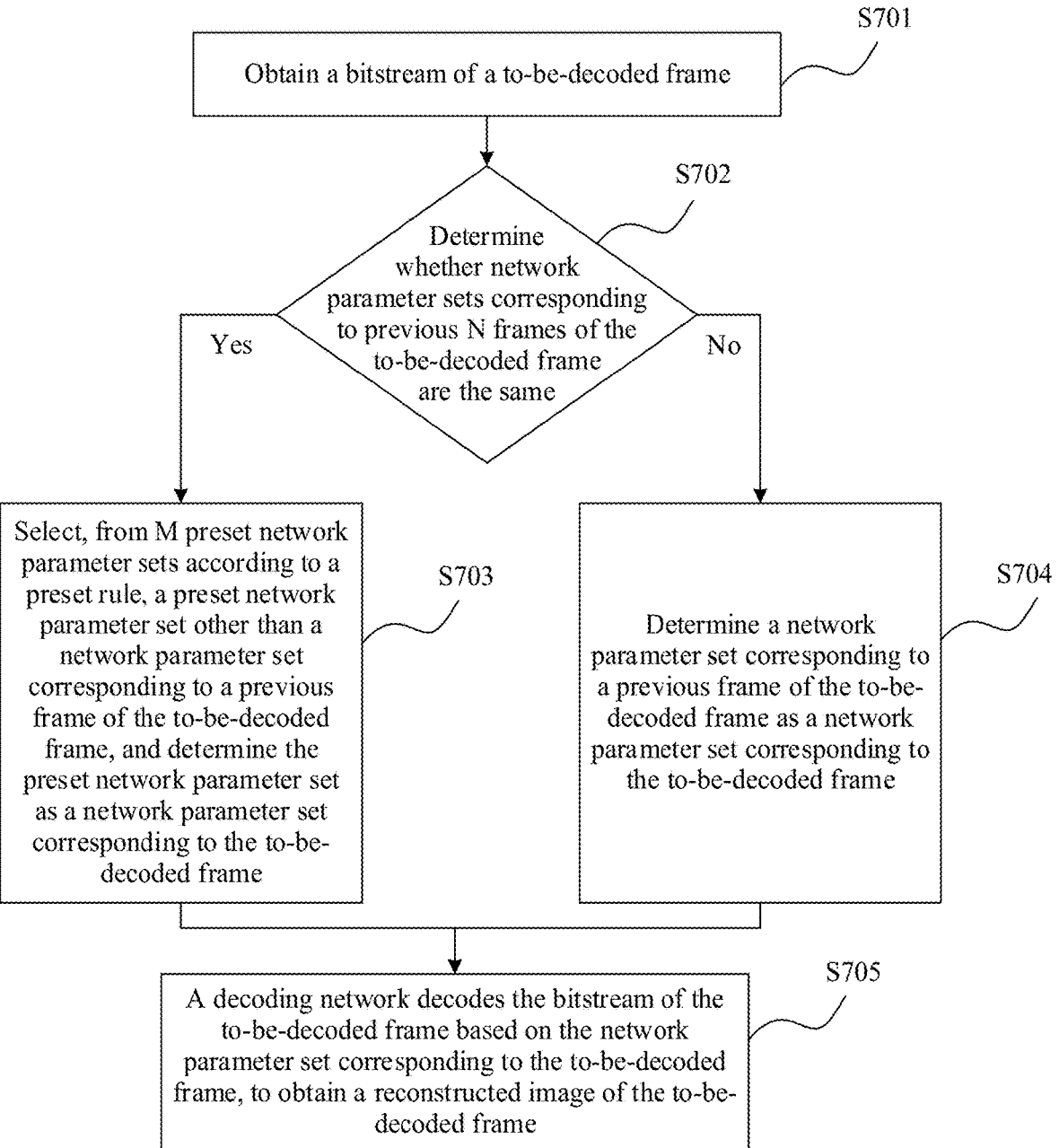

S701

Obtain a bitstream of a to-be-decoded frame

S702

Determine whether network parameter sets corresponding to previous N frames of the to-be-decoded frame are the same Yes No Select, from M preset network parameter sets according to a preset rule, a preset network parameter set other than a network parameter set corresponding to a previous frame of the to-be-decoded frame, and determine the preset network parameter set as a network parameter set corresponding to the to-be-decoded frame

S703

Determine a network parameter set corresponding to a previous frame of the to-be-decoded frame as a network parameter set corresponding to the to-be-decoded frame

S704

A decoding network decodes the bitstream of the to-be-decoded frame based on the network parameter set corresponding to the to-be-decoded frame, to obtain a reconstructed image of the to-be-decoded frame

ENCODING METHOD, DECODING METHOD, AND ELECTRONIC DEVICE

CROSS-REFERENCE TO RELATED APPLICATIONS

This is a continuation of International Patent Application No. PCT/CN2023/077117, filed on Feb. 20, 2023, which claims priority to Chinese Patent Application No. 202210224692.2, filed on Mar. 7, 2022. The disclosures of the aforementioned applications are hereby incorporated by reference in their entireties.

TECHNICAL FIELD

Embodiments of this disclosure relate to the data processing field, and in particular, to an encoding method, a decoding method, and an electronic device.

BACKGROUND

Development of a neural network in the image compression field and performance surpassing some compression methods drive gradually wide application of a deep learning-based video compression method.

In a deep learning-based video compression/decompression process, because a reconstructed image of a previous frame participates in reconstruction of a next frame, quality of the reconstructed image of the previous frame affects quality of a reconstructed image of the next frame. When quality of a frame degrades, an accumulative error in time sequence is formed as time increases. Consequently, a chain reaction is formed, and compression performance of all frames after the frame degrades.

SUMMARY

To resolve the foregoing technical problem, this disclosure provides an encoding method, a decoding method, and an electronic device. In this method, an accumulative error can be reduced, and compression performance can be improved.

According to a first aspect, an embodiment provides an encoding method. The method includes first obtaining a to-be-encoded frame, where the to-be-encoded frame is a P-frame (Predictive-frame), then determining, from M preset network parameter sets, a network parameter set corresponding to the to-be-encoded frame, where the M preset network parameter sets respectively correspond to different compression performance information, and M is an integer greater than 1, and then encoding, by an encoding network, the to-be-encoded frame based on the network parameter set corresponding to the to-be-encoded frame to obtain a bitstream of the to-be-encoded frame. In this way, in an encoding procedure, the encoding network can encode a plurality of adjacent frames by using different network parameters, so that the plurality of adjacent frames have high/low alternating compression performance, and adversarial compression performance is constructed in time sequence, thereby reducing an accumulative error in a structure, and improving compression performance.

For example, the M preset network parameter sets are obtained in M different training manners.

For example, the compression performance information may include image quality and/or a compression rate.

According to the first aspect, M is equal to 2, and the M preset network parameter sets include a first preset network parameter set and a second preset network parameter set and the determining, from M preset network parameter sets, a network parameter set corresponding to the to-be-encoded frame includes, when a frame identifier of the to-be-encoded frame is an odd number, determining the first preset network parameter set as the network parameter set corresponding to the to-be-encoded frame and when a frame identifier of the to-be-encoded frame is an even number, determining the second preset network parameter set as the network parameter set corresponding to the to-be-encoded frame. In this way, two adjacent frames can be encoded by using different network parameter sets.

It should be understood that, when the frame identifier of the to-be-encoded frame is an odd number, the second preset network parameter set may alternatively be determined as the network parameter set corresponding to the to-be-encoded frame and when the frame identifier of the to-be-encoded frame is an even number, the first preset network parameter set may alternatively be determined as the network parameter set corresponding to the to-be-encoded frame. Whether the encoding network encodes the to-be-encoded frame whose frame identifier is an odd number by using the first preset network parameter set or encodes the to-be-encoded frame whose frame identifier is an odd number by using the second preset network parameter set is not limited in this disclosure.

For example, the frame identifier of the to-be-encoded frame may be a POC (Picture Order Count) value, or may be a frame sequence number of the to-be-encoded frame. This is not limited in this disclosure.

According to any one of the first aspect or the foregoing implementations of the first aspect, compression performance information corresponding to the first preset network parameter set is higher than compression performance information corresponding to the second preset network parameter set' or compression performance information corresponding to the second preset network parameter set is higher than compression performance information corresponding to the first preset network parameter set.

For example, when the compression performance information is image quality, image quality corresponding to the first preset network parameter set is higher than image quality corresponding to the second preset network parameter set, or image quality corresponding to the second preset network parameter set is higher than image quality corresponding to the first preset network parameter set.

For example, when the compression performance information is a compression rate, a compression rate corresponding to the first preset network parameter set is higher than a compression rate corresponding to the second preset network parameter set, or a compression rate corresponding to the second preset network parameter set is higher than a compression rate corresponding to the first preset network parameter set.

For example, when the compression performance information includes image quality and a compression rate, image quality corresponding to the first preset network parameter set is higher than image quality corresponding to the second preset network parameter set, and a compression rate corresponding to the first preset network parameter set is higher than a compression rate corresponding to the second preset network parameter set. Alternatively, image quality corresponding to the second preset network parameter set is higher than image quality corresponding to the first preset network parameter set, and a compression rate corresponding to the second preset network parameter set is higher than a compression rate corresponding to the first preset network parameter set.

According to any one of the first aspect or the foregoing implementations of the first aspect, the determining, from M preset network parameter sets, a network parameter set corresponding to the to-be-encoded frame includes, when network parameter sets corresponding to previous N frames of the to-be-encoded frame are the same, selecting, from the M preset network parameter sets according to a preset rule, a preset network parameter set other than a network parameter set corresponding to a previous frame adjacent to the to-be-encoded frame as the network parameter set corresponding to the to-be-encoded frame; or when network parameter sets corresponding to previous N frames of the to-be-encoded frame are different, determining a network parameter set corresponding to a previous frame adjacent to the to-be-encoded frame as the network parameter set corresponding to the to-be-encoded frame, where N is an integer greater than 1. In this way, every N consecutive frames can be encoded by using a same network parameter set.

For example, the preset rule may be preset, and may be set based on a requirement. This is not limited in this disclosure. For example, $k(i)=k(i-1)+1$, where $k(i)$ is a sequence number of the network parameter set corresponding to the to-be-encoded frame, $k(i-1)$ is a sequence number of the network parameter set corresponding to the previous frame adjacent to the to-be-encoded frame, and numbers of the M preset network parameter sets may be 1 to M.

According to any one of the first aspect or the foregoing implementations of the first aspect, the determining, from M preset network parameter sets, a network parameter set corresponding to the to-be-encoded frame includes: determining the compression performance information respectively corresponding to the M preset network parameter sets; and determining, from the M preset network parameter sets based on the compression performance information respectively corresponding to the M preset network parameter sets, the network parameter set corresponding to the to-be-encoded frame.

According to any one of the first aspect or the foregoing implementations of the first aspect, the determining, from the M preset network parameter sets based on the compression performance information respectively corresponding to the M preset network parameter sets, the network parameter set corresponding to the to-be-encoded frame includes: if compression performance information corresponding to previous K frames of the to-be-encoded frame is higher than a threshold, using a preset network parameter set, in the M preset network parameter sets, whose corresponding compression performance information is lower than the threshold as the network parameter set corresponding to the to-be-encoded frame; or if compression performance information corresponding to previous K frames of the to-be-encoded frame is lower than a threshold, using a preset network parameter set, in the M preset network parameter sets, whose corresponding compression performance information is higher than the threshold as the network parameter set corresponding to the to-be-encoded frame, where K is a positive integer. Alternatively, if compression performance information corresponding to a previous frame adjacent to the to-be-encoded frame is lower than a threshold, using a preset network parameter set, in the M preset network parameter sets, whose corresponding compression performance information is lower than the threshold as the network parameter set corresponding to the to-be-encoded frame; or if compression performance information corresponding to a previous frame adjacent to the to-be-encoded frame is higher than a threshold, using a preset network parameter set, in the M preset network parameter sets, whose corresponding compression performance information is higher than the threshold as the network parameter set corresponding to the to-be-encoded frame. In this way, every K consecutive frames can be encoded by using one network parameter set.

For example, K may be greater than N, may be less than N, or may be equal to N. This is not limited in this disclosure.

According to any one of the first aspect or the foregoing implementations of the first aspect, one preset network parameter set includes a plurality of preset network parameter groups; the encoding network includes a plurality of subnets, and the plurality of subnets respectively correspond to the plurality of preset network parameter groups; and some preset network parameter groups in any two preset network parameter sets in the M preset network parameter sets are different.

According to any one of the first aspect or the foregoing implementations of the first aspect, the bitstream of the to-be-encoded frame includes a set identifier of the network parameter set corresponding to the to-be-encoded frame. In this way, a decoder side can parse the bitstream to obtain the set identifier, to determine the network parameter set for decoding the bitstream.

According to a second aspect, an embodiment provides a decoding method. The method includes first obtaining a bitstream of a to-be-decoded frame, where the to-be-decoded frame is a P-frame, then determining, from M preset network parameter sets, a network parameter set corresponding to the to-be-decoded frame, where the M preset network parameter sets respectively correspond to different compression performance information, and M is an integer greater than 1; and then decoding, by a decoding network, the bitstream of the to-be-decoded frame based on the network parameter set corresponding to the to-be-decoded frame, to obtain a reconstructed image of the to-be-decoded frame. In this way, a decoder side can correspond to an encoder side, and decode the bitstream by using different network parameter sets.

According to the second aspect, M is equal to 2, and the M preset network parameter sets include a first preset network parameter set and a second preset network parameter set; and the determining, from M preset network parameter sets, a network parameter set corresponding to the to-be-decoded frame includes: when a frame identifier of the to-be-decoded frame is an odd number, determining the first preset network parameter set as the network parameter set corresponding to the to-be-decoded frame; or when a frame identifier of the to-be-decoded frame is an even number, determining the second preset network parameter set as the network parameter set corresponding to the to-be-decoded frame. In this way, two adjacent frames can be decoded by using different network parameter sets.

According to any one of the second aspect or the foregoing implementations of the second aspect, compression performance information corresponding to the first preset network parameter set is higher than compression performance information corresponding to the second preset network parameter set; or compression performance information corresponding to the second preset network parameter set is higher than compression performance information corresponding to the first preset network parameter set.

According to any one of the second aspect or the foregoing implementations of the second aspect, the determining, from M preset network parameter sets, a network parameter set corresponding to the to-be-decoded frame includes parsing the bitstream of the to-be-decoded frame to obtain a set identifier; and determining a preset network parameter set, in the M preset network parameter sets, matching the set identifier as the network parameter set corresponding to the to-be-decoded frame.

According to any one of the second aspect or the foregoing implementations of the second aspect, the determining, from M preset network parameter sets, a network parameter set corresponding to the to-be-decoded frame includes when network parameter sets respectively corresponding to previous N frames of the to-be-decoded frame are the same, selecting, from the M preset network parameter sets according to a preset rule, a preset network parameter set other than a network parameter set corresponding to a previous frame adjacent to the to-be-decoded frame as the network parameter set corresponding to the to-be-decoded frame, or when network parameter sets respectively corresponding to previous N frames of the to-be-decoded frame are different, determining a network parameter set corresponding to a previous frame adjacent to the to-be-decoded frame as the network parameter set corresponding to the to-be-decoded frame, where N is an integer greater than 1.

According to a third aspect, this disclosure provides a training method. The training method includes first obtaining a training image, then obtaining a target network, where the target network has M pairs of initial network parameter sets, and M is an integer greater than 1; and then separately updating the M pairs of initial network parameter sets of the target network based on M loss value determining manners and the training image, to obtain M pairs of preset network parameter sets. The target network includes an encoding network and a decoding network, and a pair of preset network parameter sets includes: a preset network parameter set corresponding to the encoding network and a preset network parameter set corresponding to the decoding network. In this way, M preset network parameter sets of the encoding network and M preset network parameter sets of the decoding network are obtained by jointly training the encoding network and the decoding network.

For example, in the target network, the decoding network is connected behind the encoding network, that is, an output of the encoding network is connected to an input of the decoding network. An input of the encoding network is an input of the target network, and an output of the decoding network is an output of the target network.

According to the third aspect, the separately updating the M pairs of initial network parameter sets of the target network based on M loss value determining manners and the training image, to obtain M pairs of preset network parameter sets includes: for an $i^{th}$ pair of initial network parameter sets, and a value range of i being 1 to M: loading, by the target network, the $i^{th}$ pair of initial network parameter sets, and inputting the training image into the target network, to obtain a reconstructed image output by the target network; determining, in an $i^{th}$ loss value determining manner and based on the reconstructed image and the training image, a loss value corresponding to the $i^{th}$ pair of initial network parameter sets; and updating the $i^{th}$ pair of initial network parameter sets based on the loss value corresponding to the $i^{th}$ pair of initial network parameter sets, to obtain an $i^{th}$ pair of preset network parameter sets. In this way, a pair of preset network parameter sets is trained by using one loss value determining manner and the training image.

According to any one of the third aspect or the foregoing implementations of the third aspect, the target network further has an initial shared network parameter group, and the separately updating the M pairs of initial network parameter sets of the target network based on M loss value determining manners and the training image, to obtain M pairs of preset network parameter sets further includes, when loading the $i^{th}$ pair of initial network parameter sets, loading, by the target network, the initial shared network parameter group, when updating the $i^{th}$ pair of initial network parameter sets based on the loss value corresponding to the $i^{th}$ pair of initial network parameter sets, performing an $i^{th}$ group of update on the initial shared network parameter group based on the loss value corresponding to the $i^{th}$ pair of initial network parameter sets, and separately adding, to the M pairs of preset network parameter sets, a preset shared network parameter group obtained by performing M groups of update on the initial shared network parameter group. In this way, the initial shared network parameter group is alternately trained in the M loss value determining manners, to obtain the preset shared network parameter group. This can improve a training speed.

According to any one of the third aspect or the foregoing implementations of the third aspect, the M determining manners correspond to M loss functions; and/or the M determining manners correspond to M groups of calculation data, and the M groups of calculation data are used to calculate M groups of loss values.

According to a fourth aspect, an embodiment provides an encoding system. The encoding system includes a selector and an encoding network, where the selector is configured to determine, from M preset network parameter sets, a network parameter set corresponding to a to-be-encoded frame, where the to-be-encoded frame is a P-frame, the M preset network parameter sets respectively correspond to different compression performance information, and M is an integer greater than 1; and the encoding network is configured to encode the to-be-encoded frame based on the network parameter set corresponding to the to-be-encoded frame, to obtain a bitstream of the to-be-encoded frame.

According to the fourth aspect, the selector may be configured to perform the encoding method corresponding to any implementation of the first aspect.

For technical effect corresponding to any one of the fourth aspect and the implementations of the fourth aspect, refer to technical effect corresponding to any one of the first aspect and the implementations of the first aspect. Details are not described herein again.

According to a fifth aspect, an embodiment provides a decoding system. The decoding system includes a selector and a decoding network, where the selector is configured to determine, from M preset network parameter sets, a network parameter set corresponding to a to-be-decoded frame, where the to-be-decoded frame is a P-frame, the M preset network parameter sets respectively correspond to different compression performance information, and M is an integer greater than 1; and the decoding network is configured to decode a bitstream of the to-be-decoded frame based on the network parameter set corresponding to the to-be-decoded frame, to obtain a reconstructed image of the to-be-decoded frame.

According to the fifth aspect, the selector may be configured to perform the decoding method corresponding to any implementation of the second aspect.

For technical effect corresponding to any one of the fifth aspect and the implementations of the fifth aspect, refer to the technical effect corresponding to any one of the second aspect and the implementations of the second aspect. Details are not described herein again.

According to a sixth aspect, an embodiment provides an electronic device, including a memory and a processor. The memory is coupled to the processor, the memory stores program instructions, and when the program instructions are executed by the processor, the electronic device is enabled to perform the encoding method according to any one of the first aspect or the possible implementations of the first aspect.

Any one of the sixth aspect and the implementations of the sixth aspect corresponds to any one of the first aspect and the implementations of the first aspect. For technical effect corresponding to any one of the sixth aspect and the implementations of the sixth aspect, refer to the technical effect corresponding to any one of the first aspect and the implementations of the first aspect. Details are not described herein again.

According to a seventh aspect, an embodiment provides an electronic device, including a memory and a processor. The memory is coupled to the processor, the memory stores program instructions, and when the program instructions are executed by the processor, the electronic device is enabled to perform the decoding method according to any one of the second aspect or the possible implementations of the second aspect.

Any one of the seventh aspect and the implementations of the seventh aspect corresponds to any one of the second aspect and the implementations of the second aspect. For technical effect corresponding to any one of the seventh aspect and the implementations of the seventh aspect, refer to the technical effect corresponding to any one of the second aspect and the implementations of the second aspect. Details are not described herein again.

According to an eighth aspect, an embodiment provides an electronic device, including a memory and a processor. The memory is coupled to the processor, the memory stores program instructions, and when the program instructions are executed by the processor, the electronic device is enabled to perform the training method according to any one of the third aspect or the possible implementations of the third aspect.

Any one of the eighth aspect and the implementations of the eighth aspect corresponds to any one of the third aspect and the implementations of the third aspect. For technical effect corresponding to any one of the eighth aspect and the implementations of the eighth aspect, refer to the technical effect corresponding to any one of the third aspect and the implementations of the third aspect. Details are not described herein again.

According to a ninth aspect, an embodiment provides a chip, including one or more interface circuits and one or more processors. The interface circuit is configured to: receive a signal from a memory of an electronic device, and send the signal to the processor, where the signal includes computer instructions stored in the memory. When the processor executes the computer instructions, the electronic device is enabled to perform the encoding method according to any one of the first aspect or the possible implementations of the first aspect.

Any one of the ninth aspect and the implementations of the ninth aspect corresponds to any one of the first aspect and the implementations of the first aspect. For technical effect corresponding to any one of the ninth aspect and the implementations of the ninth aspect, refer to the technical effect corresponding to any one of the first aspect and the implementations of the first aspect. Details are not described herein again.

According to a tenth aspect, an embodiment provides a chip, including one or more interface circuits and one or more processors. The interface circuit is configured to: receive a signal from a memory of an electronic device, and send the signal to the processor, where the signal includes computer instructions stored in the memory. When the processor executes the computer instructions, the electronic device is enabled to perform the decoding method according to any one of the second aspect or the possible implementations of the second aspect.

Any one of the tenth aspect and the implementations of the tenth aspect corresponds to any one of the second aspect and the implementations of the second aspect. For technical effect corresponding to any one of the tenth aspect and the implementations of the tenth aspect, refer to the technical effect corresponding to any one of the second aspect and the implementations of the second aspect. Details are not described herein again.

According to an eleventh aspect, an embodiment provides a chip, including one or more interface circuits and one or more processors. The interface circuit is configured to receive a signal from a memory of an electronic device, and send the signal to the processor, where the signal includes computer instructions stored in the memory. When the processor executes the computer instructions, the electronic device is enabled to perform the training method according to any one of the third aspect or the possible implementations of the third aspect.

Any one of the eleventh aspect and the implementations of the eleventh aspect corresponds to any one of the third aspect and the implementations of the third aspect. For technical effect corresponding to any one of the eleventh aspect and the implementations of the eleventh aspect, refer to the technical effect corresponding to any one of the third aspect and the implementations of the third aspect. Details are not described herein again.

According to a twelfth aspect, an embodiment provides a computer storage medium. The computer-readable storage medium stores a computer program, and when the computer program is run on a computer or a processor, the computer or the processor is enabled to perform the encoding method according to any one of the first aspect or the possible implementations of the first aspect.

Any one of the twelfth aspect and the implementations of the twelfth aspect corresponds to any one of the first aspect and the implementations of the first aspect. For technical effect corresponding to any one of the twelfth aspect and the implementations of the twelfth aspect, refer to the technical effect corresponding to any one of the first aspect and the implementations of the first aspect. Details are not described herein again.

According to a thirteenth aspect, an embodiment provides a computer storage medium. The computer-readable storage medium stores a computer program, and when the computer program is run a computer or a processor, the computer or the processor is enabled to perform the decoding method according to any one of the second aspect or the possible implementations of the second aspect.

Any one of the thirteenth aspect and the implementations of the thirteenth aspect corresponds to any one of the second aspect and the implementations of the second aspect. For technical effect corresponding to any one of the thirteenth aspect and the implementations of the thirteenth aspect, refer to the technical effect corresponding to any one of the second aspect and the implementations of the second aspect. Details are not described herein again.

According to a fourteenth aspect, an embodiment provides a computer storage medium. The computer-readable storage medium stores a computer program, and when the computer program is run on a computer or a processor, the computer or the processor is enabled to perform the training method according to any one of the third aspect or the possible implementations of the third aspect.

Any one of the fourteenth aspect and the implementations of the fourteenth aspect corresponds to any one of the third aspect and the implementations of the third aspect. For technical effect corresponding to any one of the fourteenth aspect and the implementations of the fourteenth aspect, refer to the technical effect corresponding to any one of the third aspect and the implementations of the third aspect. Details are not described herein again.

According to a fifteenth aspect, an embodiment provides a computer program product. The computer program product includes a software program, and when the software program is executed by a computer or a processor, steps of the method according to any one of the first aspect or the possible implementations of the first aspect are performed.

Any one of the fifteenth aspect and the implementations of the fifteenth aspect corresponds to any one of the first aspect and the implementations of the first aspect. For technical effect corresponding to any one of the fifteenth aspect and the implementations of the fifteenth aspect, refer to the technical effect corresponding to any one of the first aspect and the implementations of the first aspect. Details are not described herein again.

According to a sixteenth aspect, an embodiment provides a computer program product. The computer program product includes a software program, and when the software program is executed by a computer or a processor, steps of the method according to any one of the second aspect or the possible implementations of the second aspect are performed.

Any one of the sixteenth aspect and the implementations of the sixteenth aspect corresponds to any one of the second aspect and the implementations of the second aspect. For technical effect corresponding to any one of the sixteenth aspect and the implementations of the sixteenth aspect, refer to the technical effect corresponding to any one of the second aspect and the implementations of the second aspect. Details are not described herein again.

According to a seventeenth aspect, an embodiment provides a computer program product. The computer program product includes a software program, and when the software program is executed by a computer or a processor, steps of the method according to any one of the third aspect or the possible implementations of the third aspect are performed.

Any one of the seventeenth aspect and the implementations of the seventeenth aspect corresponds to any one of the third aspect and the implementations of the third aspect. For technical effect corresponding to any one of the seventeenth aspect or the implementations of the seventeenth aspect, refer to technical effect corresponding to any one of the third aspect or the implementations of the third aspect. Details are not described herein again.

BRIEF DESCRIPTION OF DRAWINGS

FIG. 7 is a diagram of an example of a decoding procedure;

DESCRIPTION OF EMBODIMENTS

The following clearly and completely describes technical solutions in embodiments of this disclosure with reference to the accompanying drawings of examples of embodiments. It is clear that the described embodiments are some but not all embodiments. All other embodiments obtained by a person of ordinary skill in the art based on embodiments of this disclosure without creative efforts shall fall within the protection scope of this disclosure.

The term "and/or" in this specification describes only an association relationship between associated objects and indicates that three relationships may exist. For example, A and/or B may represent the following three cases: Only A exists, both A and B exist, and only B exists.

In the specification and claims in embodiments of this disclosure, the terms "first", "second", and so on are intended to distinguish between different objects but do not indicate a particular order of the objects. For example, a first target object, a second target object, and the like are used for distinguishing between different target objects, but are not used for describing a specific order of the target objects.

In embodiments of this disclosure, the word "example", "for example", or the like is used to represent giving an example, an illustration, or a description. Any embodiment or design scheme described as "example" or "for example" in embodiments should not be explained as being more preferred or having more advantages than another embodiment or design scheme. Use of the word "example", "for example", or the like is intended to present a related concept in a specific manner.

In the descriptions of embodiments, unless otherwise stated, "a plurality of" means two or more than two. For example, a plurality of processing units refer to two or more processing units. A plurality of systems refer to two or more systems.

Figure 1:
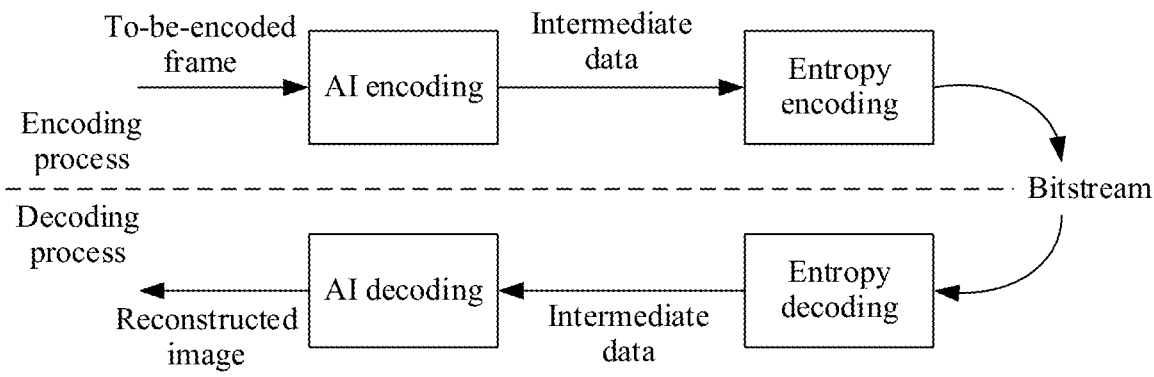
FIG. 1 is a diagram of an example of an application scenario.

FIG. 1 is a diagram of an example of an application scenario.

Refer to FIG. 1. For example, an image compression process may be as follows. Artificial Intelligence (AI) encoding may be performed on a to-be-encoded frame to obtain intermediate data, where the intermediate data may be data to be transmitted to a decoder side. For example, the intermediate data may include inter side information (which may be relative motion information of the to-be-encoded frame relative to pixels of a previous frame), residual information (a difference between a to-be-decoded frame and corresponding prediction information), and the like. This is not limited in this disclosure. Then, entropy encoding may be performed on the intermediate data to obtain a bitstream of the to-be-encoded frame.

Still refer to FIG. 1. For example, an image decompression process may be as follows. After a bitstream is obtained, entropy decoding may be performed on the bitstream to obtain corresponding intermediate data, and then AI decoding is performed based on the intermediate data to obtain a corresponding reconstructed image.

For example, entropy encoding is encoding without any information loss according to an entropy principle in an encoding procedure. Entropy encoding may include a plurality of types, for example, Shannon coding, Huffman coding, and arithmetic coding. This is not limited in this disclosure.

For example, the to-be-encoded frame may be any one of a raw (unprocessed) image, an RGB (a color mode, where "R" represents red, "G" represents green, and "B" represents blue) image, and a YUV (a color mode, where "Y" represents luminance or Luma, and "U" and "V" are represent chrominance or chroma components) image. This is not limited in this disclosure.

For example, the compression process and the decompression process may be performed by a same electronic device, or may be performed by different electronic devices. This is not limited in this disclosure.

For example, this disclosure is applied to compression and decompression of an independent image, or applied to compression and decompression of a plurality of frames of images in a video sequence. This is not limited in this disclosure.

For example, this disclosure is applied to a plurality of scenarios, for example, a Huawei cloud storage (or transmission) image (or video) scenario, a video surveillance scenario, or a live broadcast scenario. This is not limited in this disclosure.

It should be understood that the encoding procedure in FIG. 1 is merely an example of an encoding procedure in this disclosure. The encoding procedure in this embodiment may have more steps than those shown in FIG. 1. This is not limited in this disclosure. Similarly, the decoding procedure in FIG. 1 is merely an example of a decoding procedure. The decoding procedure may have more steps than those shown in FIG. 1. This is not limited in this disclosure. In this disclosure, an example in which an encoding procedure includes AI encoding and entropy encoding, and a decoding procedure includes AI decoding and entropy decoding is used for description.

For example, AI encoding and entropy encoding shown in FIG. 1 may be implemented by using an encoding network, that is, the to-be-encoded frame is input into the encoding network, and the encoding network performs AI encoding and entropy encoding, and outputs the bitstream.

For example, AI decoding and entropy decoding shown in FIG. 1 may also be implemented by using a decoding network. The bitstream is input into the decoding network, and the decoding network performs entropy decoding and AI decoding, and outputs the reconstructed image.

For example, the encoding network and the decoding network may be trained in advance by using different training methods, and the encoding network and the decoding network separately obtains M (M is an integer greater than 1) sets of network parameters through training. The encoding network and the decoding network are jointly trained. Therefore, the obtained M sets of network parameters of the encoding network are in a one-to-one correspondence with the obtained M sets of network parameters of the decoding network. The M sets of network parameters of the encoding network correspond to different compression performance information, and the M sets of network parameters of the decoding network correspond to different compression performance information, where the compression performance information may include image quality and/or a compression rate. In this way, in a process in which the encoding network encodes a plurality of adjacent frames, different network parameters are used, so that the plurality of adjacent frames have high/low alternating compression performance, and adversarial compression performance is constructed in time sequence, thereby reducing an accumulative error in a structure, and improving compression performance.

For example, for ease of description, a target network may be used to represent the encoding network and the decoding network, to explain a joint process of the encoding network and the decoding network. For example, in the target network, the decoding network is connected behind the encoding network, that is, an input of the target network is an input of the encoding network, an output of the encoding network is connected to an input of the decoding network, and an output of the decoding network is an output of the target network.

It should be noted that a frame that is encoded/decoded based on a reconstructed image of a previous frame is a P-frame. Therefore, a network for encoding the P-frame in the encoding network and a network for decoding the P-frame in the decoding network are trained below.

Figure 2:
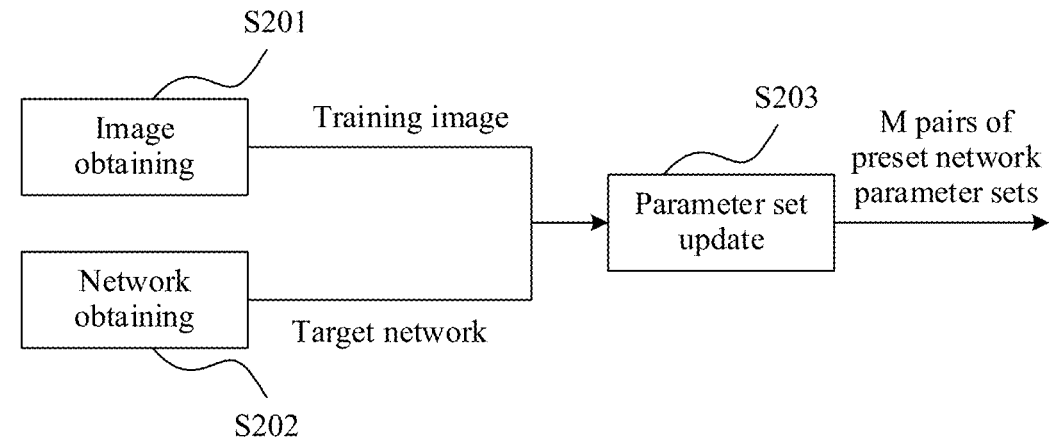
FIG. 2 is a diagram of an example of a training process.

FIG. 2 is a diagram of an example of a training process.

S201: Obtain a training image.

For example, a plurality of video sequences may be collected, and each video sequence may include a plurality of frames of images. One video sequence may be used as a group of training images. In this way, a plurality of groups of training images can be obtained, and each group of training images may include a plurality of frames of images.

S202: Obtain a target network, where the target network includes M pairs of initial network parameter sets, and M is an integer greater than 1.

For example, an encoding network may include M network parameter sets, a decoding network may include M network parameter sets, and the target network may include M pairs of network parameter sets. For ease of description, a network parameter set of the target network before training may be referred to as a default network parameter set.

For example, first-phase training may be first performed on the target network by using the plurality of groups of training images, to update a parameter in the default network parameter set, to obtain the initial network parameter set.

For example, the following uses a group of training images as an example to describe a first-phase training process. For example, consecutive X1 (X1 is a positive integer greater than 1) frames of images may be selected from the group of training images, where a first frame in the consecutive X1 frames of images is an I-frame (Intra frame, intra frame), and the other frames are P-frames. For example, the target network may first load an $i^{th}$ (a value range of i is 1 to M, and i is an integer) pair of default network parameter sets, and then input a reconstructed image of the I-frame and a first P-frame in the consecutive X1 frames of images to the target network, to obtain a reconstructed image of the first P-frame output by the target network. After the reconstructed image of the first P-frame is obtained, a loss value is calculated based on the first P-frame and the reconstructed image of the first P-frame, to obtain the loss value corresponding to the first P-frame.

Then, the reconstructed image of the first P-frame and a second P-frame in the consecutive X1 frames of images are input into the target network, to obtain a reconstructed image of the second P-frame output by the target network. Then, a loss value is calculated based on the second P-frame and the reconstructed image of the second P-frame, to obtain the loss value corresponding to the second P-frame. By analogy, loss values corresponding to (X1-1) P-frames may be obtained.

Then, the $i^{th}$ pair of default network parameter sets of the target network may be updated based on the loss values corresponding to the (X1-1) P-frames. Further, in the foregoing manner, the $i^{th}$ pair of default network parameter sets updated last time is updated by sequentially using each group of training images until a first preset condition is met, to obtain an $i^{th}$ pair of initial network parameter sets. The first preset condition may be a condition for stopping the first-phase training, and may be set based on a requirement. This is not limited in this disclosure. Then, values of the $i^{th}$ pair of initial network parameter sets of the target network may be separately assigned to the other M=1 pairs of default network parameter sets of the target network. In this way, the M pairs of initial network parameter sets of can be obtained. The M pairs of initial network parameter sets are the same, that is, the M pairs of initial network parameter sets correspond to the same compression performance information.

Then, second-phase training is performed on the target network by using the plurality of groups of training images, to separately update parameters in the M pairs of initial network parameter sets, to obtain M pairs of preset network parameter sets. For a second-phase training process, refer to S203.

S203: Separately update the M pairs of initial network parameter sets of the target network based on M loss value determining manners and the training image, to obtain the M pairs of preset network parameter sets.

For example, parameters in a pair of initial network parameter sets of the target network may be updated based on one loss value determining manner and a plurality of groups of training images, to obtain a pair of preset network parameter sets. The pair of preset network parameter sets of the target network includes a preset network parameter set of the encoding network and a preset network parameter set of the decoding network. In this way, the M preset network parameter sets of the encoding network and the M preset network parameter sets of the decoding network can be obtained.

The following uses an example in which an $i^{th}$ pair of initial network parameter sets in the M pairs of initial network parameter sets is updated for description. A value range of i is 1 to M, and i is an integer.

For example, a group of training images is used as an example. First, consecutive X2 (X2 is a positive integer, and X2 may be greater than X1) frames of images may be selected from the group of training images. A first frame in the consecutive X2 frames of images is an I-frame, and the other frames are P-frames. In addition, the target network may first load the $i^{th}$ pair of initial network parameter sets. Then, a reconstructed image of the I-frame and a first P-frame in the consecutive X2 frames of images are input into the target network, and the target network performs forward calculation, to obtain a reconstructed image of the first P-frame output by the target network. Then, a loss value is calculated based on the first P-frame and the reconstructed image of the first P-frame, to obtain the loss value corresponding to the first P-frame.

Then, the reconstructed image of the first P-frame and a second P-frame in the consecutive X2 frames of images are input into the target network, and the target network performs forward calculation, to obtain a reconstructed image of the second P-frame output by the target network. Then, a loss value is calculated based on the second P-frame and the reconstructed image of the second P-frame, to obtain the loss value corresponding to the second P-frame. By analogy, loss values corresponding to (X2-1) P-frames may be obtained.

For example, an $i^{th}$ loss value determining manner may be: determining a loss value used for backpropagation, that is, a loss value corresponding to the $i^{th}$ pair of initial network parameter sets, based on the loss values corresponding to the (X2-1) P-frames. Further, backpropagation is performed on the target network based on the loss values corresponding to the (X2-1) P-frames, that is, updating is performed on parameters in the $i^{th}$ pair of initial network parameter sets of the target network. Further, in the foregoing manner, the $i^{th}$ pair of initial network parameter sets updated last time is updated by sequentially using each group of training images until the second preset condition is met, to obtain an $i^{th}$ pair of preset network parameter sets, that is, an $i^{th}$ preset network parameter set of the encoding network and an $i^{th}$ preset network set of the decoding network are obtained. The second preset condition may be a condition for completing training of the $i^{th}$ pair of preset network parameter sets, and may be set based on a requirement. This is not limited in this disclosure.

For example, it is assumed that X2=4, first four frames (that is, IPPP frames) of the group of training images may be input into the target network loading the $i^{th}$ pair of initial network parameter sets, and the target network performs forward calculation. Then, the $i^{th}$ pair of initial network parameter sets of the target network may be updated based on a loss value corresponding to the first P-frame, a loss value corresponding to the second P-frame, and a loss value corresponding to the third P-frame, to obtain the $i^{th}$ pair of preset network parameter sets.

In a possible manner, the M determining manners correspond to M groups of calculation data, the M groups of calculation data are used to calculate M groups of loss values, and each group of calculation data includes at least one P-frame and a reconstructed image of the P-frame. In other words, when any two pairs of initial network parameter sets in the M pairs of initial network parameter sets are updated, calculation data used to calculate loss values is different. In this way, any two preset network parameter sets in the obtained M preset network parameter sets of the encoding network are different, and correspond to different compression performance information; and any two preset network parameter sets in the M preset network parameter sets of the decoding network are different, and correspond to different compression performance information.

For example, a quantity X2 of images selected from each group of training images for a $j^{th}$ (a value range of j is 1 to M, j is an integer, and j is not equal to i) pair of initial network parameter sets is the same as a quantity X2 of images selected from each group of training images for the $i^{th}$ pair of initial network parameter sets, but updating is performed only based on loss values corresponding to (X2-2) P-frames (other than the first P-frame).

It is assumed that the quantity X2 of images selected from each group of training images for the $j^{th}$ pair of initial network parameter sets is the same as the quantity X2 of training images selected from each group of training images for the $i^{th}$ pair of initial network parameter sets, and both are equal to 4, first four frames (that is, IPPP) of the group of training images may be input into the target network loading the $j^{th}$ pair of initial network parameter sets, and the target network performs forward calculation. However, when backpropagation is performed on the target network, the $j^{th}$ pair of initial network parameter sets of the target network is updated only based on a loss value corresponding to the second P-frame and a loss value corresponding to the third P-frame.

For another example, a quantity X2 of images selected from each group of training images for a $j^{th}$ pair of initial network parameter sets is different from a quantity X2 of images selected from each group of training images for the $i^{th}$ pair of initial network parameter sets; and a P-frame used to calculate a corresponding loss value for the $j^{th}$ pair of initial network parameter sets is different from a P-frame used to calculate a corresponding loss value for the $i^{th}$ pair of initial network parameter sets.

It is assumed that for the $i^{th}$ pair of initial network parameter sets, the quantity X2 of images selected from each group of training images is 4, and for the $j^{th}$ pair of initial network parameter sets, the quantity X2 of images selected from each group of training images is 5. In this case, the $j^{th}$ pair of initial network parameter sets may be updated by using first five frames (that is, IPPPP frames) of the group of training images. The $j^{th}$ pair of initial network parameter sets of the target network may be updated based on a loss value corresponding to the first P-frame, a loss value corresponding to the second P-frame, a loss value corresponding to the third P-frame, and a loss value corresponding to the fourth P-frame.

It should be noted that, for the M pairs of initial network parameter sets, in an update process, if an initial network parameter set is updated based on loss values corresponding to more P-frames, compression performance information of a corresponding preset network parameter set is better.

In a possible manner, the M determining manners correspond to M loss functions. In other words, loss functions for updating any two pairs of initial network parameter sets in the M pairs of initial network parameter sets are different. For example, if an $i^{th}$ pair of initial network parameter sets is updated, a loss function I is used. If a $j^{th}$ (a value range of j is 1 to M, j is an integer, and j is not equal to i) pair of initial network parameter sets is updated, a loss function J is used. In this way, any two preset network parameter sets in the obtained M preset network parameter sets of the encoding network are different, and correspond to different compression performance information; and any two preset network parameter sets in the M preset network parameter sets of the decoding network are different, and correspond to different compression performance information.

For example, the loss function I may be $\lambda_1*d+bpp$, and the loss function J may be $\lambda_2*d+bpp$, and $\lambda_1$ is not equal to $\lambda_2$. A smaller d (distortion) value indicates higher image quality, and a larger bpp (Bits per pixel, bits used for storing each pixel) value indicates a lower compression rate. In this way, the $i^{th}$ pair of initial network parameters can be updated based on a loss value obtained by calculating $\lambda_1*d+bpp$, to obtain the $i^{th}$ pair of preset network parameter sets. In addition, the $j^{th}$ pair of initial network parameters can be updated based on a loss value obtained by calculating $\lambda_2*d+bpp$, to obtain the $j^{th}$ pair of preset network parameter sets. If $\lambda_1$ is less than $\lambda_2$, obtained compression performance information corresponding to the $j^{th}$ pair of preset network parameter sets is higher than compression performance information corresponding to the $i^{th}$ pair of preset network parameter sets; or if $\lambda_1$ is greater than $\lambda_2$, obtained compression performance information corresponding to the $i^{th}$ pair of preset network parameter sets is higher than compression performance information corresponding to the $j^{th}$ pair of preset network parameter sets.

It should be understood that, for any two pairs of initial network parameter sets in the M pairs of initial network parameter sets, when loss functions used to calculate loss values are different and/or calculation data used to calculate loss values is different, two pairs of correspondingly obtained preset network parameter sets are different and correspond to different compression performance information.

In a possible manner, the encoding network may include Y (Y is a positive integer) subnets, and each of the Y subnets includes M sets of parameters. In this way, in the obtained M preset network parameter sets of the encoding network, each preset network parameter set may include Y preset network parameter groups, each preset network parameter group corresponds to one subnet, and all preset network parameter groups of any two preset network parameter sets in the M preset network parameter sets are different.

In a possible manner, the decoding network may include Y subnets, and each of the Y subnets includes M sets of parameters. In this way, in the obtained M preset network parameter sets of the decoding network, each preset network parameter set may include Y preset network parameter groups, each preset network parameter group corresponds to one subnet, and all preset network parameter groups of any two preset network parameter sets in the M preset network parameter sets are different.

In a possible manner, each of Y1 subnets in the Y subnets included in the encoding network includes M sets of parameters, and each of the other Y2 subnets includes only one set of parameters, where Y1 and Y2 are positive integers, and Y1+Y2=Y. In this way, in the obtained M preset network parameter sets corresponding to the encoding network according to the foregoing method, each preset network parameter set includes only Y1 preset network parameter groups. After first-phase training, Y2 initial shared network parameter groups of the encoding network may be obtained, and each initial shared network parameter group corresponds to one of the Y2 subnets.

In a possible manner, the decoding network includes Y subnets, each of Y1 subnets in the plurality of subnets include M sets of parameters, and each of the other Y2 subnets include only one set of parameters. In this way, in the obtained M preset network parameter sets corresponding to the decoding network according to the foregoing method, each preset network parameter set includes only Y1 preset network parameter groups. After first-phase training, Y2 initial shared network parameter groups of the decoding network may be obtained, and each initial shared network parameter group corresponds to one of the Y2 subnets.

In this way, the target network may include Y2 pairs of initial shared network parameter groups, and one pair of initial shared network parameter groups may include: an initial shared network parameter group corresponding to one subnet of the encoding network and an initial shared network parameter group corresponding to one subnet of the decoding network. For example, when each pair of the M pairs of initial network parameter sets is updated, the Y2 pairs of initial shared network parameter groups may be updated. In this way, Y2 pairs of preset shared network parameter groups may be obtained. An example process may be as follows:

For example, when loading the $i^{th}$ pair of initial network parameter sets, the target network loads the Y2 pairs of initial shared network parameter groups; and when the $i^{th}$ pair of initial network parameter sets is updated based on a loss value corresponding to the $i^{th}$ pair of initial network parameter sets, an $i^{th}$ group of update is performed on the Y2 pairs of initial shared network parameter groups based on the loss value corresponding to the $i^{th}$ pair of initial network parameter sets. In this way, when the M pairs of preset network parameter sets are obtained, M groups of update are performed on the Y2 pairs of initial shared network parameter groups, to obtain the Y2 pairs of preset shared network parameter groups. Then, the Y2 pairs of preset shared network parameter groups each may be separately added to the M pairs of preset network parameter sets. A pair of preset shared network parameter groups in the Y2 pairs of preset shared network parameter groups may include one preset shared network parameter group of the encoding network and one preset shared network parameter group of the decoding network. In this way, the Y2 preset shared network parameter groups of the encoding network each can be separately added to the M preset network parameter sets of the encoding network; and the Y2 preset shared network parameter groups of the decoding network each can be separately added to the M preset network parameter sets of the decoding network.

In this way, in the M preset network parameter sets of the encoding network, Y2 preset shared network parameter groups in any two preset network parameter sets are the same, and Y1 preset network parameter groups are different. Correspondingly, in the M preset network parameter sets of the decoding network, Y2 preset shared network parameter groups in any two preset network parameter sets are the same, and Y1 preset network parameter groups are different.

Through the foregoing training, the M preset network parameter sets of the encoding network and the M preset network parameter sets of the decoding network can be obtained.

The following describes a process in which the encoding/decoding network performs encoding/decoding on the to-be-encoded/decoded frame by using the corresponding preset network parameter set.

Figure 3A:
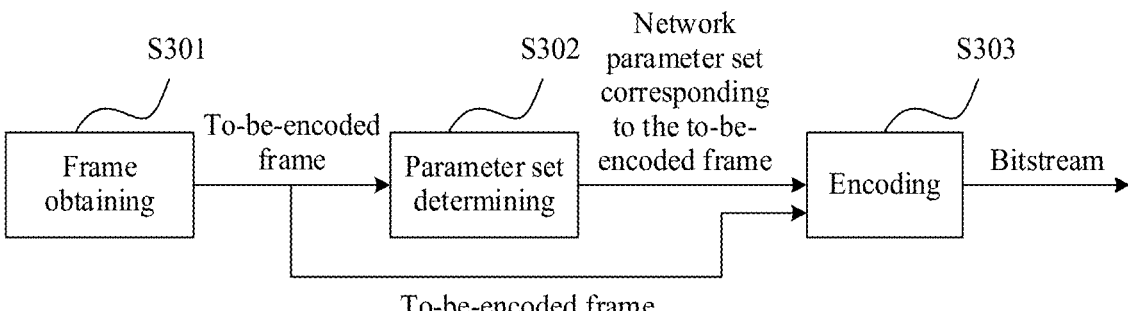
FIG. 3A is a diagram of an example of an encoding procedure.

FIG. 3A is a diagram of an example of an encoding procedure.

S301: Obtain a to-be-encoded frame.

For example, after the to-be-encoded frame is obtained, it is determined whether the to-be-encoded frame is a P-frame. When the to-be-encoded frame is a P-frame, S302 and S303 may be performed to encode the to-be-encoded frame. When the to-be-encoded frame is an I-frame, the I-frame may be input into an I-frame encoding network, and the I-frame encoding network encodes the I-frame and outputs a bit-stream of the to-be-encoded frame. The I-frame encoding network may be a network used for encoding the I-frame.

S302: Determine, from M preset network parameter sets, a network parameter set corresponding to the to-be-encoded frame, where the M preset network parameter sets respectively correspond to different compression performance information, and M is an integer greater than 1.

For example, a network parameter selection condition may be preset. For example, the network parameter selection condition may be set based on a frame identifier of the to-be-encoded frame, compression performance information respectively corresponding to the M preset network parameter sets, or network parameter sets corresponding to several previous encoded frames of the to-be-encoded frame. Details are described below.

For example, when the to-be-encoded frame is a P-frame, the network parameter set corresponding to the to-be-encoded frame may be selected from the M preset network parameter sets based on the network parameter selection condition.

S303: An encoding network encodes the to-be-encoded frame based on the network parameter set corresponding to the to-be-encoded frame, to obtain a bitstream of the to-be-encoded frame.

For example, the encoding network may load the network parameter set corresponding to the to-be-encoded frame, and then encode the to-be-encoded frame by using a reconstructed image of a previous frame adjacent to the to-be-encoded frame as a reference, to obtain the bitstream of the to-be-encoded frame. Then, the bitstream may be sent to another device or stored locally. This is not limited in this disclosure.

It should be noted that, in a possible manner, S301 to S303 are all performed by the encoding network.

Figure 3B:
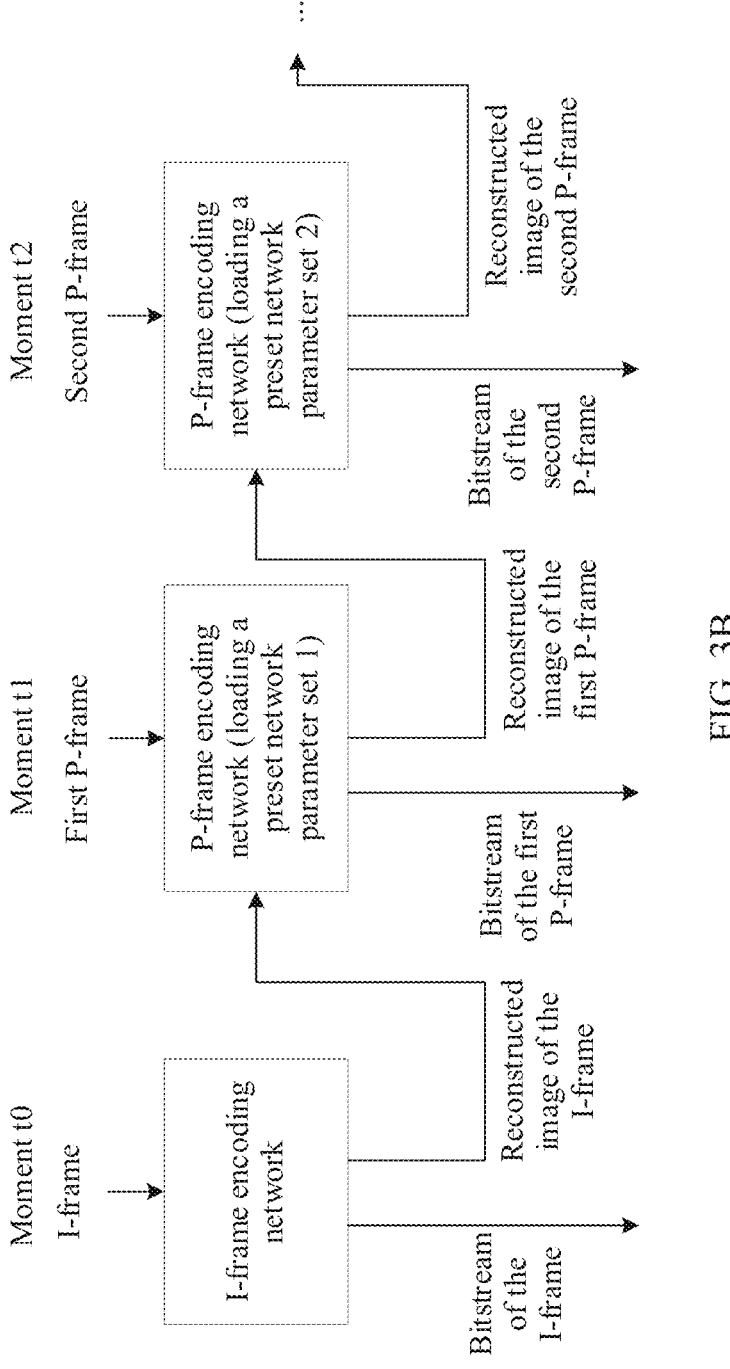
FIG. 3B is a diagram of an example of an encoding procedure.

FIG. 3B is a diagram of an example of an encoding procedure.

It is assumed that a to-be-encoded video sequence includes five frames, and the five frames are IPPPP.

Refer to FIG. 3B. For example, at a moment t0, a first frame (that is, the I-frame) in the to-be-encoded video sequence is a to-be-encoded frame, and the I-frame may be input into an I-frame encoding network, where the I-frame encoding network may be a network used for encoding the I-frame. Then, after the I-frame encoding network performs processing, the I-frame encoding network may output a bitstream of the I-frame. In addition, the I-frame encoding network may output a reconstructed image of the I-frame, and use the reconstructed image of the I-frame as an input of a P-frame encoding network at a next moment (that is, at a moment t1). The P-frame encoding network may be a network used for encoding the P-frame, that is, the encoding network described in this disclosure.

At the moment t1, a second frame (that is, the first P-frame) in the to-be-encoded video sequence is a to-be-encoded frame. If the P-frame encoding network determines that a network parameter set corresponding to the to-be-encoded frame is a preset network parameter set 1, the P-frame encoding network may load the preset network parameter set 1, and may input the reconstructed image of the I-frame output by the I-frame encoding network and the first P-frame to the P-frame encoding network. Then, after the P-frame encoding network performs processing, the P-frame encoding network may output a bitstream of the first P-frame. In addition, the P-frame encoding network may use a reconstructed image of the first P-frame as an input of the P-frame encoding network at a next moment (a moment t2).

At the moment t2, a third frame (that is, the second P-frame) in the to-be-encoded video sequence is a to-be-encoded frame. If the P-frame encoding network determines that the network parameter set corresponding to the to-be-encoded frame is a preset network parameter set 2, the P-frame encoding network may load the preset network parameter set 2, and may input the reconstructed image of the first P-frame output by the P-frame encoding network at the moment t1 and the second P-frame to the P-frame encoding network. Then, after the P-frame encoding network performs processing, the P-frame encoding network may output a bitstream of the second P-frame. In addition, the P-frame encoding network may use a reconstructed image of the second P-frame as an input of the P-frame encoding network at a next moment. By analogy, encoding of the to-be-encoded video sequence may be completed in the foregoing manner, to obtain a bitstream of the to-be-encoded video sequence.

Figure 3C:
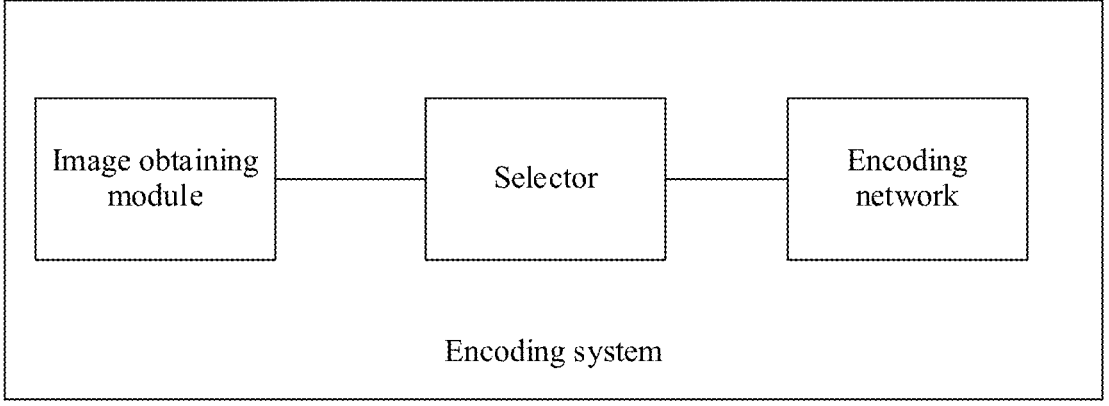
FIG. 3C is a diagram of a structure of an example of an encoding system.

FIG. 3C is a diagram of a structure of an example of an encoding system.

Refer to FIG. 3C. For example, the encoding system may include an image obtaining module, a selector, and an encoding network. The image obtaining module is configured to perform S301, the selector is configured to perform S302, and the encoding network is configured to perform S303.

Figure 3D:
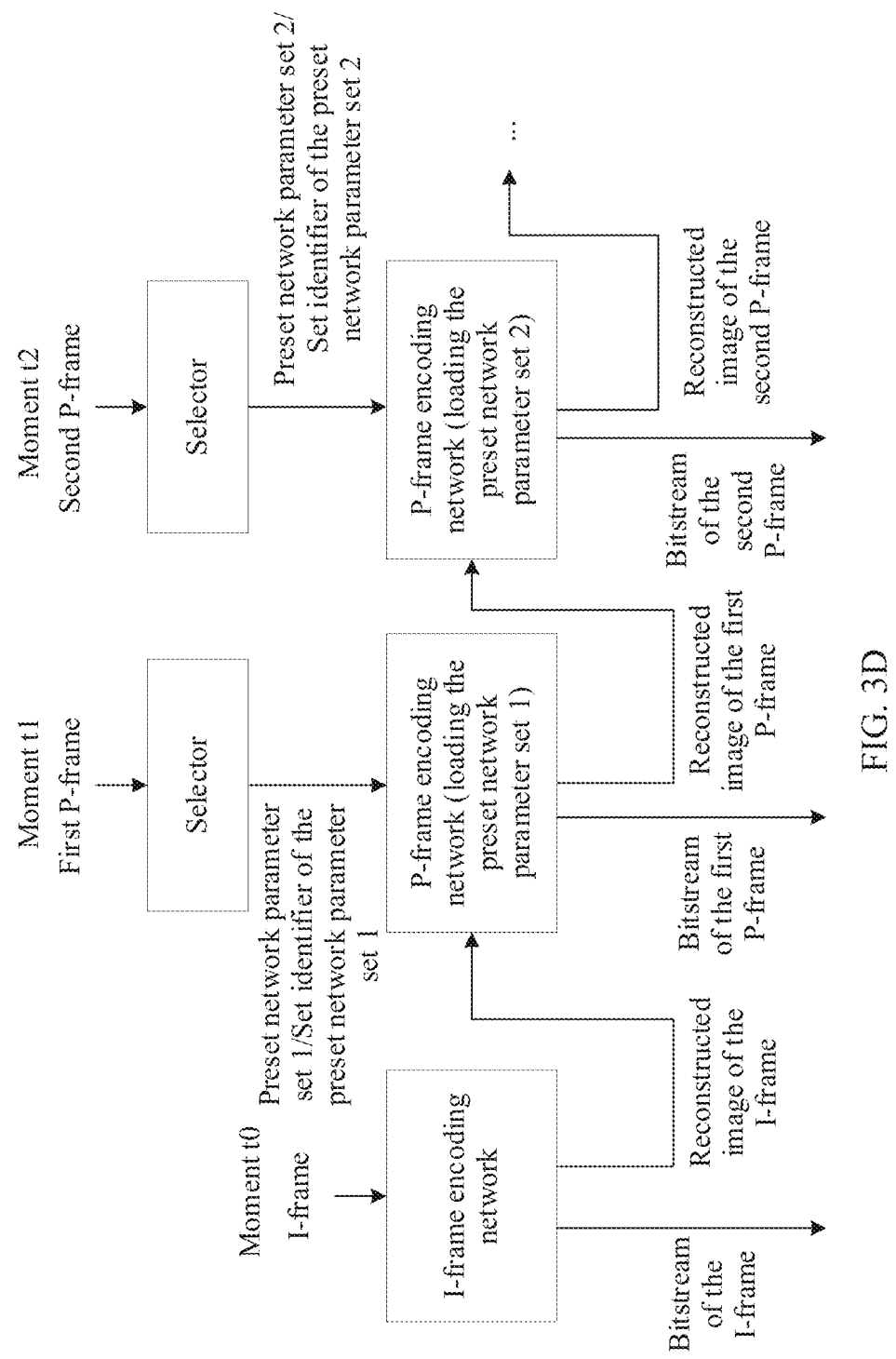
FIG. 3D is a diagram of an example of an encoding procedure.

FIG. 3D is a diagram of an example of an encoding procedure.

A difference between the encoding procedure in FIG. 3D and the encoding procedure in FIG. 3B lies in that, in FIG. 3D, a network parameter set that corresponds to a to-be-encoded frame and that is loaded by a P-frame encoding network at each moment is determined by a selector. At a moment t1, the selector determines, from M preset network parameter sets, that the network parameter set corresponding to the to-be-encoded frame is a preset network parameter set 1. Then, a set identifier of the preset network parameter set 1/the preset network parameter set 1 may be sent to the P-frame encoding network. In this way, the P-frame encoding network can load the preset network parameter set 1. At a moment t2, the selector determines, from the M preset network parameter sets, that the network parameter set corresponding to the to-be-encoded frame is a preset network parameter set 2. Then, a set identifier of the preset network parameter set 2/the preset network parameter set 2 may be sent to the P-frame encoding network. In this way, the P-frame encoding network can load the preset network parameter set 2, and so on. Other steps of the encoding procedure in FIG. 3D are similar to other steps of the encoding procedure in FIG. 3B, and details are not described herein again.

In this way, in a process in which the encoding network encodes a plurality of adjacent frames, different network parameter sets may be used. Because compression performance information corresponding to preset network parameter sets is different, the plurality of adjacent frames have high/low alternating compression performance, and adversarial compression performance is constructed in time sequence, thereby reducing an accumulative error in a structure, and improving compression performance.

Figure 4A:
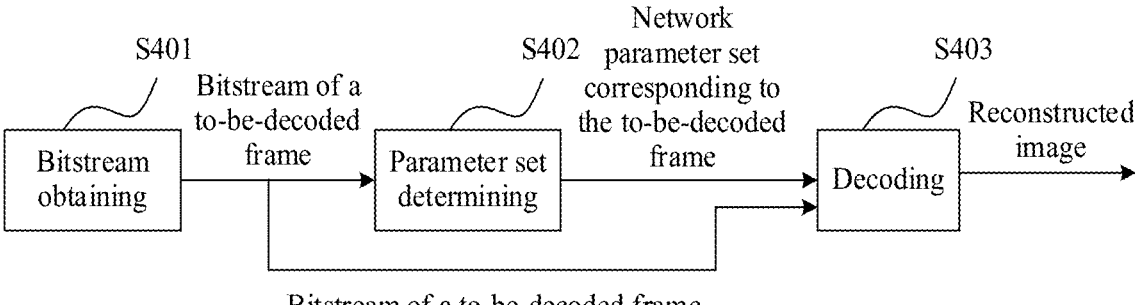
FIG. 4A is a diagram of an example of a decoding procedure.

FIG. 4A is a diagram of an example of a decoding procedure.

S401: Obtain a bitstream of a to-be-decoded frame.

For example, after the bitstream of the to-be-decoded frame is obtained, the bitstream of the to-be-decoded frame may be parsed to determine whether the to-be-decoded frame is a P-frame. When the to-be-decoded frame is a P-frame, S402 and S403 may be performed to decode the bitstream of the to-be-decoded frame. When the to-be-decoded frame is an I-frame, the bitstream of the I-frame may be input into an I-frame decoding network, and the I-frame decoding network decodes the bitstream of the I-frame to obtain a reconstructed image. The I-frame decoding network may be a network used for decoding the I-frame.

S402: Determine, from M preset network parameter sets, a network parameter set corresponding to the to-be-decoded frame, where the M preset network parameter sets respectively correspond to different compression performance information, and M is an integer greater than 1.

In a possible manner, after obtaining a bitstream of a to-be-encoded frame, an encoder side may add a set identifier of the network parameter set to the bitstream of the to-be-encoded frame. In this way, after receiving the bitstream, a decoder side can determine, from the M preset network parameter sets based on the set identifier obtained by parsing the bitstream, the network parameter set corresponding to the to-be-decoded frame.

In a possible manner, the decoder side and the encoder side pre-share a network parameter selection condition. In this way, after obtaining the bitstream of the to-be-encoded frame, the encoder side does not need to modify the bitstream of the to-be-encoded frame. Further, after receiving the bitstream, the decoding side may directly determine, from the M preset network parameter sets based on the network parameter selection condition, the network parameter set corresponding to the to-be-decoded frame.

S403: A decoding network decodes the bitstream of the to-be-decoded frame based on the network parameter set corresponding to the to-be-decoded frame, to obtain a reconstructed image of the to-be-decoded frame.

For example, the decoding network may load a network parameter set corresponding to the bitstream of the to-be-decoded frame, and then decode the bitstream of the to-be-decoded frame by using a reconstructed image of a previous frame adjacent to the to-be-decoded frame as reference, to obtain the reconstructed image of the to-be-decoded frame. Then, the decoder side may display the reconstructed image obtained through decoding.

It should be noted that, in a possible manner, S401 to S403 are all performed by the decoding network.

Figure 4B:
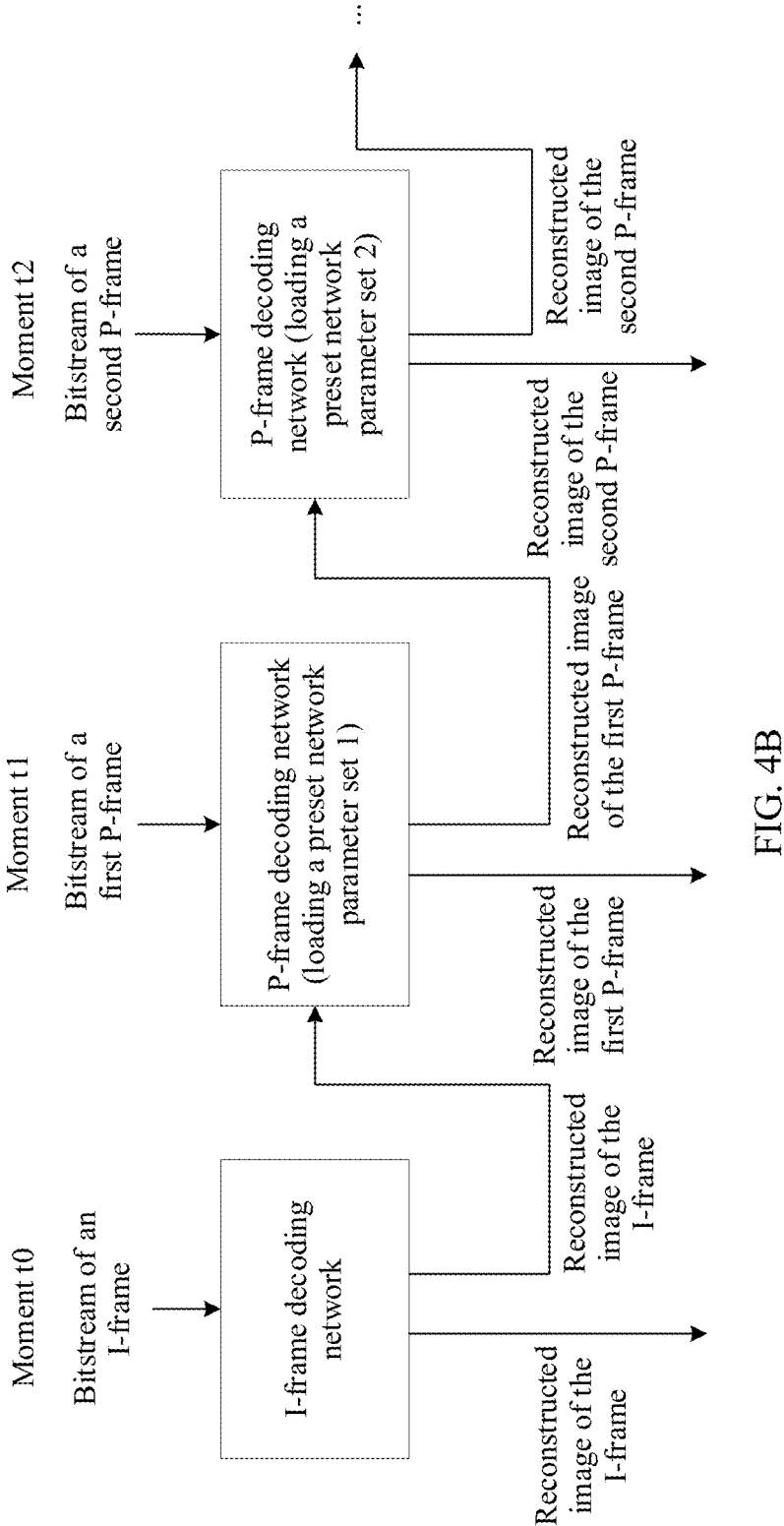
FIG. 4B is a diagram of an example of a decoding procedure.

FIG. 4B is a diagram of an example of a decoding procedure.

It is assumed that a to-be-decoded bitstream includes a bitstream of five frames, and the five frames are IPPPP. Refer to FIG. 4B. For example, at a moment t0, a bitstream of a first frame (that is, a bitstream of the I-frame) in the to-be-decoded bitstream is a bitstream of a to-be-decoded frame. The bitstream of the I-frame may be input into an I-frame decoding network, and the I-frame decoding network decodes the bitstream and outputs a reconstructed image of the I-frame. The I-frame decoding network may be a network used for decoding the I-frame. Then, the I-frame decoding network may send the reconstructed image of the I-frame to a display module, and the display module displays the reconstructed image. In addition, the I-frame decoding network may use the reconstructed image of the I-frame as an input of a P-frame decoding network at a next moment (a moment t1). The P-frame decoding network may be a network used for decoding the P-frame, that is, the decoding network described in this disclosure.

At the moment t1, a bitstream of a second frame (that is, a bitstream of the first P-frame) in the to-be-decoded bitstream is the bitstream of the to-be-decoded frame. If a P-frame encoding network determines that a network parameter set corresponding to the to-be-decoded frame is a preset network parameter set 1, the P-frame encoding network may load the preset network parameter set 1. In addition, the reconstructed image of the I-frame output by the I-frame decoding network and the bitstream of the first P-frame may be input into the P-frame decoding network, and the P-frame decoding network performs decoding, and outputs a reconstructed image of the first P-frame. The P-frame decoding network may send the reconstructed image of the first P-frame to the display module, and the display module displays the reconstructed image. In addition, the P-frame decoding network may use the reconstructed image of the first P-frame as an input of the P-frame decoding network at a next moment (a moment t2).

At the moment t2, a bitstream of a third frame (that is, a bitstream of the second P-frame) in the to-be-decoded bitstream is the bitstream of the to-be-decoded frame. If the P-frame encoding network determines that the network parameter set corresponding to the to-be-decoded frame is a preset network parameter set 2, the P-frame encoding network may load the preset network parameter set 2. In addition, the reconstructed image of the first P-frame output by the P-frame decoding network at the moment t1 and the bitstream of the second P-frame may be input into the P-frame decoding network, and the P-frame decoding network performs decoding, and outputs a reconstructed image of the second P-frame. The P-frame decoding network may send the reconstructed image of the second P-frame to the display module, and the display module displays the reconstructed image. In addition, the P-frame decoding network may use the reconstructed image of the second P-frame as an input of the P-frame decoding network at a next moment. By analogy, the decoder may complete decoding of the to-be-decoded bitstream.

Figure 4C:
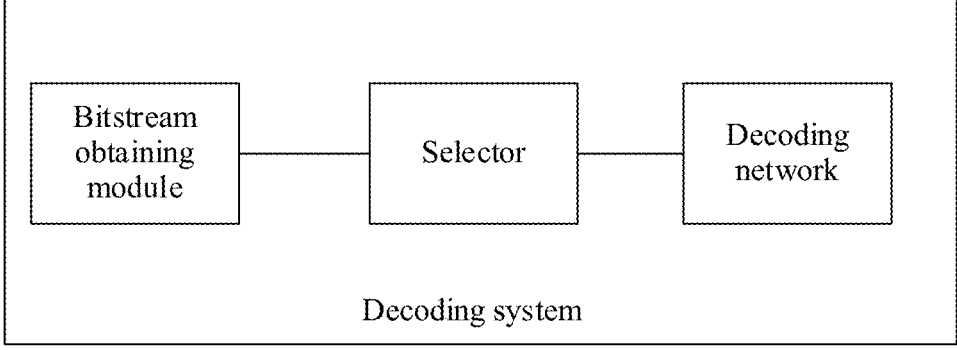
FIG. 4C is a diagram of a structure of an example of a decoding system.

FIG. 4C is a diagram of a structure of an example of a decoding system.

Refer to FIG. 4C. For example, the decoding system may include a bitstream obtaining module, a selector, and a decoding network. The bitstream obtaining module is configured to perform S401, the selector is configured to perform S402, and the decoding network is configured to perform S403.

Figure 4D:
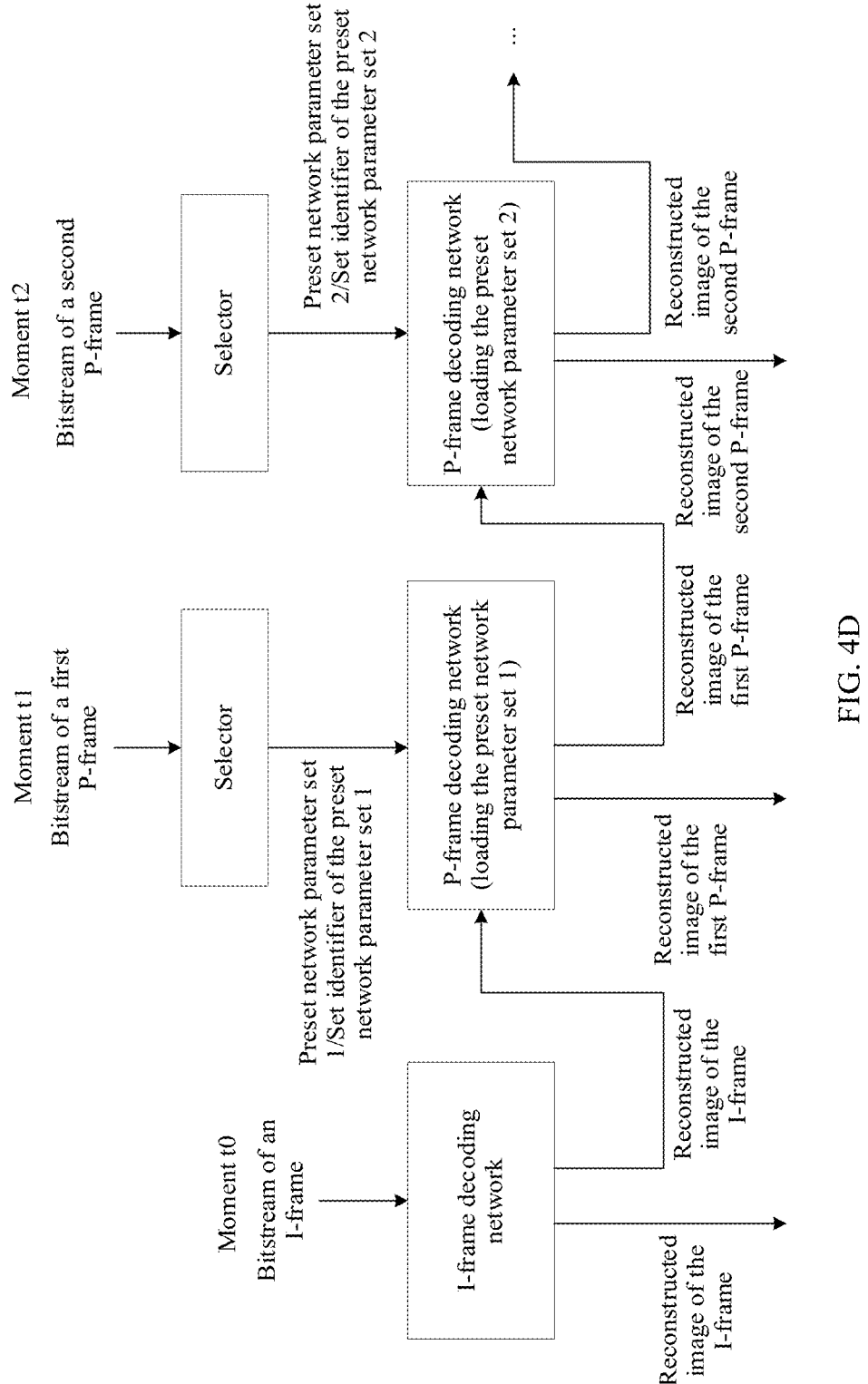
FIG. 4D is a diagram of an example of a decoding procedure.

FIG. 4D is a diagram of an example of a decoding procedure.

A difference between the decoding procedure in FIG. 4D and the decoding procedure in FIG. 4B lies in that, in FIG. 4D, a network parameter set that corresponds to a to-be-decoded frame and that is loaded by a P-frame decoding network at each moment is determined by a selector. At a moment t1, the selector determines, from M preset network parameter sets, that the network parameter set corresponding to the to-be-decoded frame is a preset network parameter set 1. Then, a set identifier of the preset network parameter set 1/the preset network parameter set 1 may be sent to the P-frame decoding network. In this way, the P-frame decoding network can load the preset network parameter set 1. At a moment t2, the selector determines, from the M preset network parameter sets, that the network parameter set corresponding to the to-be-decoded frame is a preset network parameter set 2. Then, a set identifier of the preset network parameter set 2/the preset network parameter set 2 may be sent to the P-frame decoding network. In this way, the P-frame decoding network can load the preset network parameter set 2, and so on. Other steps of the decoding procedure in FIG. 4D are similar to other steps of the decoding procedure in FIG. 4B, and details are not described herein again.

Figure 5A:
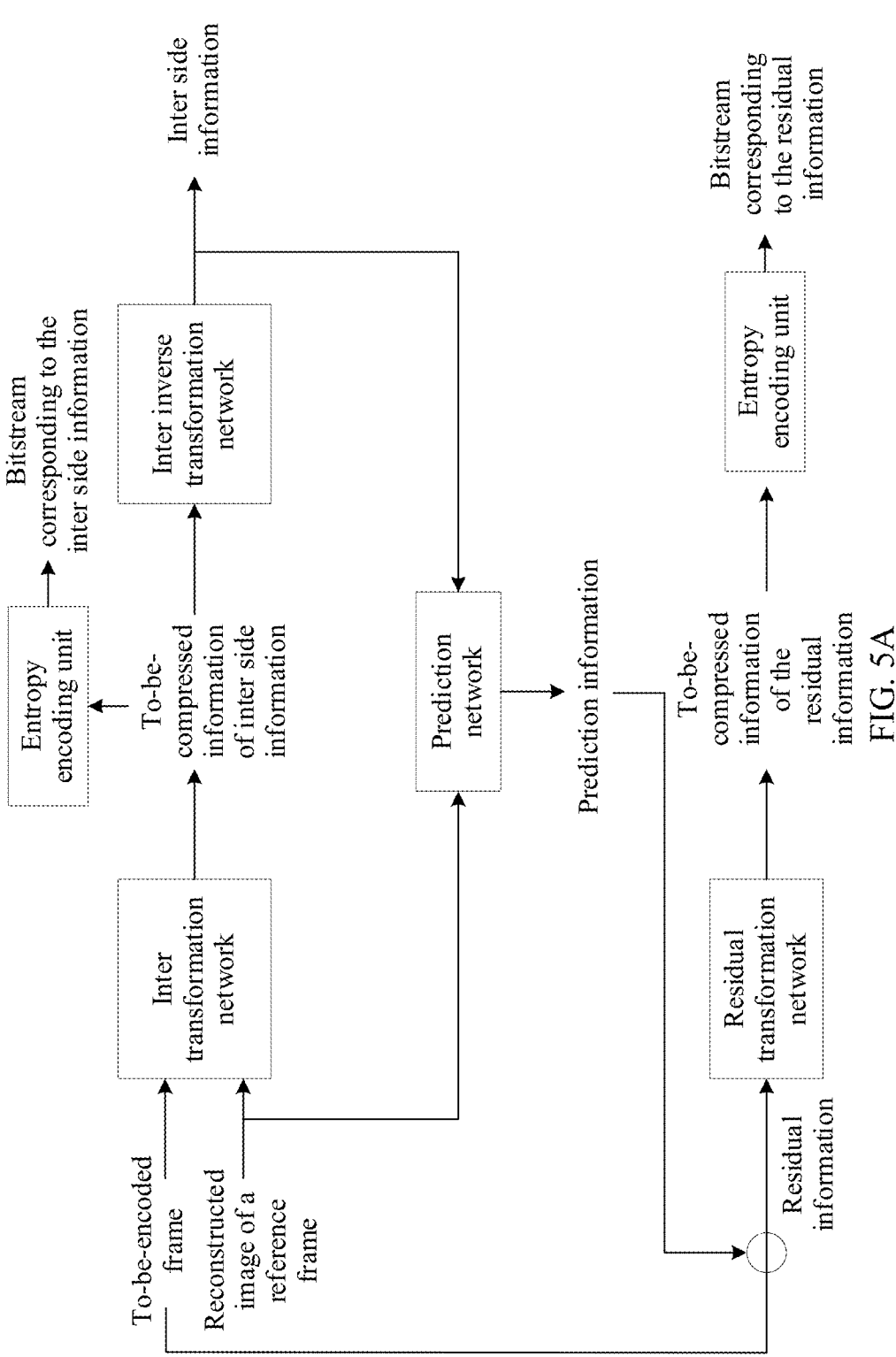
FIG. 5A is a diagram of an example of an encoding procedure.

FIG. 5A is a diagram of an example of an encoding procedure.

For example, an encoding network may include an AI encoding unit and an entropy encoding unit (as shown in FIG. 5A). The AI encoding unit is used for AI encoding, and the entropy encoding unit is used for entropy encoding. For example, the AI encoding unit may include an inter transformation network, an inter inverse transformation network, a prediction network, and a residual transformation network, as shown in FIG. 5A. It should be understood that FIG. 5A is merely an example of the AI encoding unit in this disclosure. The AI encoding unit in this disclosure may have more or fewer networks than the network shown in FIG. 5A, for example, a quantization network (used for quantization) or a probability estimation network (used for probability estimation). This is not limited in this disclosure. In addition, it should be further understood that the encoding network may further include another unit. This is not limited in this disclosure. In this disclosure, an example in which an encoding network includes an AI encoding unit and an entropy encoding unit, and the AI encoding unit includes an inter transformation network, an inter inverse transformation network, a prediction network, and a residual transformation network is used for description.

For example, the inter transformation network includes R1 subnets, the inter inverse transformation network includes R2 subnets, the prediction network includes R3 subnets, and the residual transformation network may include R4 subnets. A sum of R1, R2, R3, and R4 is less than or equal to Y. R1, R2, R3, and R4 are all positive integers, and may be set based on a requirement. This is not limited in this disclosure. Each of M preset network parameter sets of the encoding network may include: R1 preset network parameter groups 1, R2 preset network parameter groups 2, R3 preset network parameter groups 3, and R4 preset network parameter groups 4. The R1 preset network parameter groups 1 respectively correspond to the R1 subnets of the inter transformation network, the R2 preset network parameter groups 2 respectively correspond to the R2 subnets of the inter inverse transformation network, the R3 preset network parameter groups 3 respectively correspond to the R3 subnets of the prediction network, and the R4 preset network parameter groups 4 respectively correspond to the R4 subnets of the residual transformation network.

It should be noted that each subnet may include a network layer such as a convolutional layer, a downsampling layer, and an activation layer. This is not limited in this disclosure.

Figure 5B:
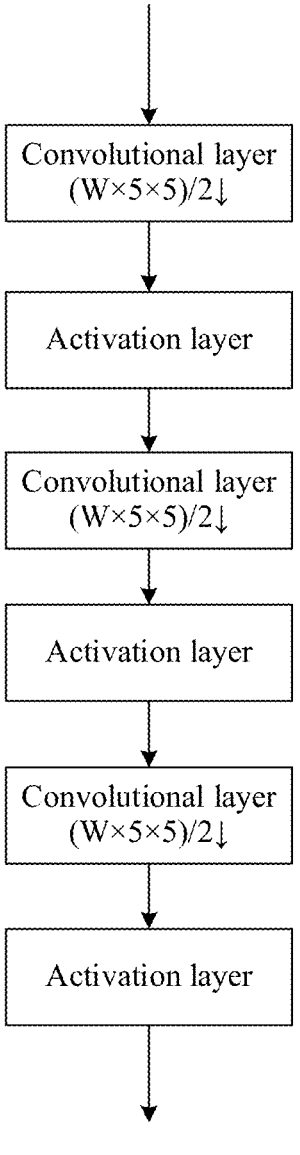
FIG. 5B is a diagram of a structure of an example of a subnet.

FIG. 5B is a diagram of a structure of an example of a subnet. In FIG. 5B, the subnet may include three convolutional layers and three activation layers, and may be connected in a manner of "convolutional layer→activation layer→convolutional layer→activation layer→convolutional layer→activation layer". "(W×5×5)/2↓" indicates that the convolutional layer may include W channels, a size of each convolution kernel is 5×5, and convolution is performed by using a step of 2.

It should be understood that FIG. 5B is merely an example of a subnet in this disclosure. The subnet in this disclosure may include more or fewer network layers than those in FIG. 5B. This is not limited in this disclosure.

In a possible manner, any one of Y subnets of the encoding network corresponds to different preset network parameter groups in any two preset network parameter sets in the M preset network parameter sets.

For example, for each of R1 subnets of an inter transformation network, a preset network parameter group 1 corresponding to the subnet in a preset network parameter set 1 is different from a preset network parameter group 1 corresponding to the subnet in a preset network parameter set 2.

For example, for each of R2 subnets of an inter inverse transformation network, a preset network parameter group 2 corresponding to the subnet in the preset network parameter set 1 is different from a preset network parameter group 2 corresponding to the subnet in the preset network parameter set 2.

For example, for each of R3 subnets of a prediction network, a preset network parameter group 3 corresponding to the subnet in the preset network parameter set 1 is different from a preset network parameter group 3 corresponding to the subnet in the preset network parameter set 2.

For example, for each of R4 subnets of a residual transformation network, a preset network parameter group 4 corresponding to the subnet in the preset network parameter set 1 is different from a preset network parameter group 4 corresponding to the subnet in the preset network parameter set 2.

In a possible manner, Y1 subnets of the encoding network correspond to different preset network parameter groups in any two preset network parameter sets of the M preset network parameter sets. The other Y2 subnets of the encoding network correspond to a same preset network parameter group in any two preset network parameter sets in the M preset network parameter sets.

For example, for G1 subnets of the inter transformation network, a preset network parameter group 1 corresponding to the G1 subnets in the preset network parameter set 1 is different from a preset network parameter group 1 corresponding to the G1 subnets in the preset network parameter set 2. For the other G2 subnets of the inter transformation network, a preset network parameter group 1 corresponding to the G2 subnets in the preset network parameter set 1 is the same as a preset network parameter group 1 corresponding to the G2 subnets in the preset network parameter set 2. G1+G2=R1, and G1 and G2 are integers, and may be set based on a requirement. This is not limited in this disclosure.

For example, for G3 subnets of an inter inverse transformation network, a preset network parameter group 2 corresponding to the G3 subnets in the preset network parameter set 1 is different from a preset network parameter group 2 corresponding to the G3 subnets in the preset network parameter set 2. For the other G4 subnets of the inter inverse transformation network, a preset network parameter group 2 corresponding to the G4 subnets in the preset network parameter set 1 is the same as a preset network parameter group 2 corresponding to the G4 subnets in the preset network parameter set 2. G3+G4=R2, and G3 and G4 are integers, and may be set based on a requirement. This is not limited in this disclosure.

For example, for G5 subnets of the prediction network, a preset network parameter group 3 corresponding to the G5 subnets in the preset network parameter set 1 is different from a preset network parameter group 3 corresponding to the G5 subnets in the preset network parameter set 2. For the other G6 subnets of the prediction network, a preset network parameter group 3 corresponding to the G6 subnets in the preset network parameter set 1 is the same as a preset network parameter group 3 corresponding to the G6 subnets in the preset network parameter set 2. G5+G6=R3, and G5 and G6 are integers, and may be set based on a requirement. This is not limited in this disclosure.

For example, for G7 subnets of the residual transformation network, a preset network parameter group 4 corresponding to the G7 subnets in the preset network parameter set 1 is different from a preset network parameter group 4 corresponding to the G7 subnets in the preset network parameter set 2. For the other G8 subnets of the residual transformation network, a preset network parameter group 4 corresponding to the G8 subnets in the preset network parameter set 1 is the same as a preset network parameter group 4 corresponding to the G8 subnets in the preset network parameter set 2. G7+G8=R4, and G7 and G8 are integers, and may be set based on a requirement. This is not limited in this disclosure.

A sum of G1, G3, G5, and G7 is less than or equal to Y1, and a sum of G2, G4, G6, and G8 is less than or equal to Y2.

Refer to FIG. 5A. For example, after obtaining the to-be-encoded frame, an encoder side may input the to-be-encoded frame and a reconstructed image of a reference frame (which may be a previous frame adjacent to the to-be-encoded frame) of the to-be-encoded frame to the inter transformation network, and the inter transformation network performs processing, and outputs to-be-compressed information of inter side information. Then, the entropy encoding unit performs entropy encoding on to-be-compressed information of the inter side information to obtain a bitstream of the inter side information. In addition, the to-be-compressed information of the inter side information may be input into the inter inverse transformation network, and the inter inverse transformation network performs processing and outputs the inter side information.

Then, the inter side information and the reconstructed image of the reference frame of the to-be-encoded frame may be input into the prediction network, and the prediction network performs processing and outputs prediction information. Then, a difference between the to-be-encoded frame and the prediction information is calculated to obtain residual information, and the residual information is input into the residual transformation network, and the residual network performs processing, and outputs to-be-compressed information of the residual information. Then, the entropy encoding unit may perform entropy encoding on the to-be-compressed information of the residual information to obtain a bitstream of the residual information.

The bitstream of the inter side information and the bitstream of the residual information form a bitstream of the to-be-encoded frame. Then, the encoder side may send the bitstream of the to-be-encoded frame to a decoder side.

Figure 5C:
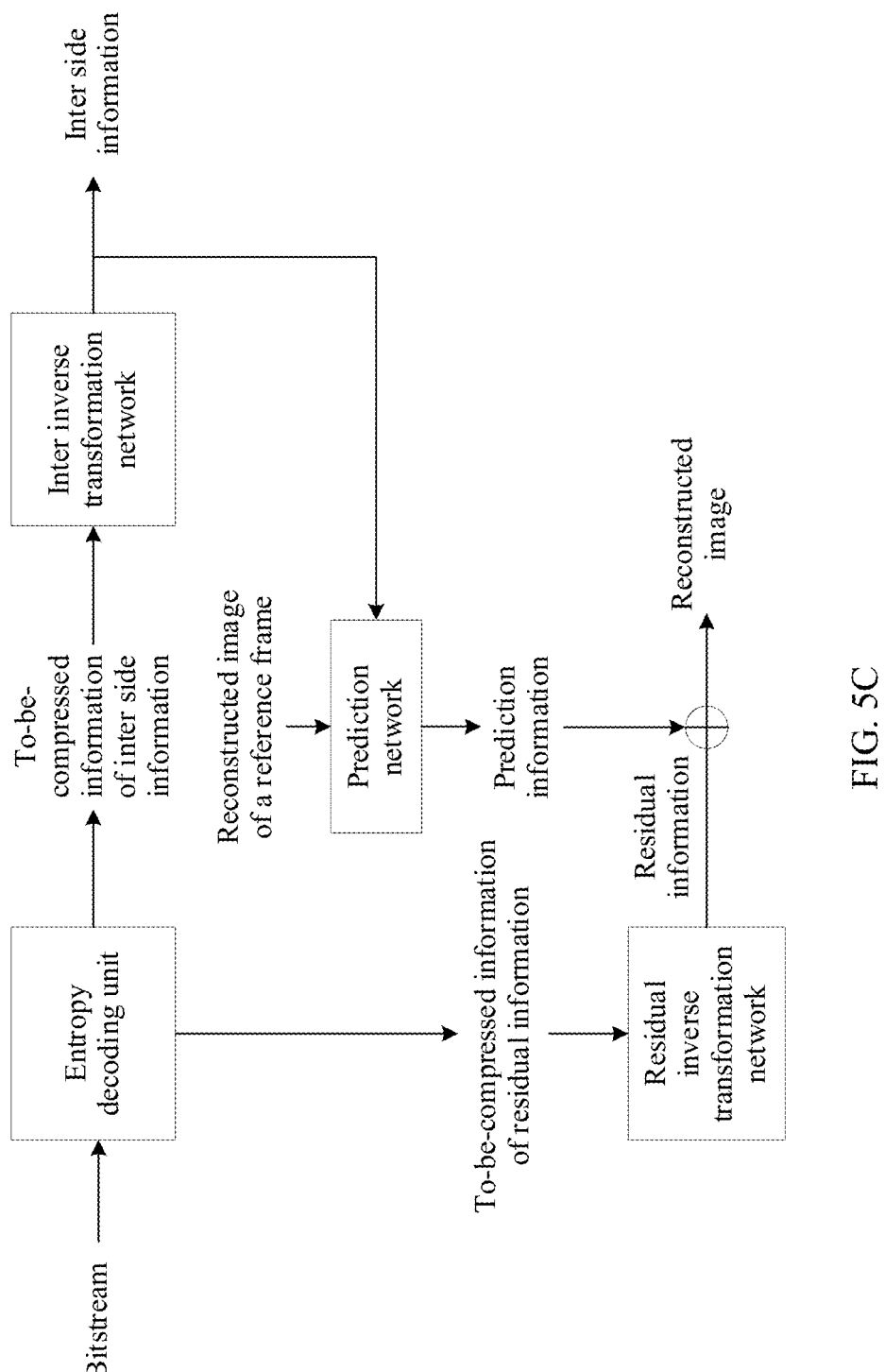
FIG. 5C is a diagram of an example of a decoding procedure.

FIG. 5C is a diagram of an example of a decoding procedure.

For example, a decoding network may include an AI decoding unit and an entropy decoding unit (as shown in FIG. 5C). The AI decoding unit is used for AI decoding, and the entropy decoding unit is used for entropy decoding. For example, the AI decoding unit may include an inter inverse transformation network, a prediction network, and a residual inverse transformation network, as shown in FIG. 5C. It should be understood that FIG. 5C is merely an example of the AI decoding unit in this disclosure. The AI decoding unit in this disclosure may have more or fewer networks than the network shown in FIGS. 5A and 5C, for example, a dequantization network (used for dequantization) or a probability estimation network (used for probability estimation). This is not limited in this disclosure. In addition, it should be further understood that the decoding network may further include another unit. This is not limited in this disclosure either. In this disclosure, an example in which the decoding network includes an AI decoding unit and an entropy decoding unit, and the AI decoding unit includes an inter inverse transformation network, a prediction network, and a residual inverse transformation network is used for description.

For example, the inter inverse transformation network includes R2 subnets, the residual inverse transformation network includes H1 subnets, and the prediction network includes R3 subnets. A sum of R2, H1 and R3 is less than or equal to Y; R2, H1, and R3 are all positive integers, and may be set based on a requirement. This is not limited in this disclosure. Each of M preset network parameter sets of the decoding network includes: R2 preset network parameter groups 2, H1 preset network parameter groups 5, and R3 preset network parameter groups 3. The R2 preset network parameter groups 2 respectively correspond to the R2 subnets of the inter inverse transformation network, the H1 preset network parameter groups 5 respectively correspond to the H1 subnets of the residual inverse transformation network, and the R3 preset network parameter groups 3 respectively correspond to the R3 subnets of the prediction network.

In a possible manner, any one of Y subnets of the decoding network corresponds to different preset network parameter groups in any two preset network parameter sets in the M preset network parameter sets.

For example, for each of the R2 subnets of the inter inverse transformation network, a preset network parameter group 2 corresponding to the subnet in a preset network parameter set 1 is different from a preset network parameter group 2 corresponding to the subnet in a preset network parameter set 2.

For example, for each of the H1 subnets of the residual inverse transformation network, a preset network parameter group 5 corresponding to the subnet in the preset network parameter set 1 is different from a preset network parameter group 5 corresponding to the subnet in the preset network parameter set 2.

For example, for each of the R3 subnets of the prediction network, a preset network parameter group 3 corresponding to the subnet in the preset network parameter set 1 is different from a preset network parameter group 3 corresponding to the subnet in the preset network parameter set 2.

In a possible manner, Y1 subnets of the decoding network correspond to different preset network parameter groups in any two preset network parameter sets of the M preset network parameter sets. The other Y2 subnets of the decoding network correspond to a same preset network parameter group in any two preset network parameter sets in the M preset network parameter sets.

For example, for G3 subnets of the inter inverse transformation network, a preset network parameter group 2 corresponding to the G3 subnets in the preset network parameter set 1 is different from a preset network parameter group 3 corresponding to the G3 subnets in the preset network parameter set 2. For the other G4 subnets of the inter inverse transformation network, a preset network parameter group 2 corresponding to the G4 subnets in the preset network parameter set 1 is the same as a preset network parameter group 2 corresponding to the G4 subnets in the preset network parameter set 2.

For example, for F1 subnets of the residual inverse transformation network, a preset network parameter group 5 corresponding to the F1 subnets in the preset network parameter set 1 is different from a preset network parameter group 5 corresponding to the F1 subnets in the preset network parameter set 2. For the other F2 subnets of the residual inverse transformation network, a preset network parameter group 5 corresponding to the F2 subnets in the preset network parameter set 1 is the same as a preset network parameter group 5 corresponding to the F2 subnets in the preset network parameter set 2. F1+F2=H1, and F1 and F2 are integers, and may be set based on a requirement. This is not limited in this disclosure.

For example, for G5 subnets of the prediction network, a preset network parameter group 3 corresponding to the G5 subnets in the preset network parameter set 1 is different from a preset network parameter group 3 corresponding to the G5 subnets in the preset network parameter set 2. For the other G6 subnets of the prediction network, a preset network parameter group 3 corresponding to the G6 subnets in the preset network parameter set 1 is the same as a preset network parameter group 3 corresponding to the G6 subnets in the preset network parameter set 2.

A sum of G3, F1, and G5 is less than or equal to Y1, and a sum of G4, F2, and G6 is less than or equal to Y2.

Refer to FIG. 5C. For example, after a decoder side receives a bitstream, the entropy decoding unit may perform entropy decoding on the bitstream to obtain to-be-compressed information of inter side information and to-be-compressed information of residual information. Then, the to-be-compressed information of the inter side information may be input into the inter inverse transformation network, and the inter inverse transformation network performs processing and outputs the inter side information. Then, the inter side information and a reconstructed image of a reference frame of the to-be-encoded frame are input into the prediction network, and the prediction network performs processing and outputs prediction information. In addition, the to-be-compressed information of the residual information may be input into the residual inverse transformation network, and the residual inverse transformation network performs processing and outputs the residual information. Then, the residual information and the prediction information may be added to obtain the reconstructed image.

The following describes a process of determining, from the M preset network parameter sets, the network parameter set corresponding to the to-be-encoded frame.

Figure 6:
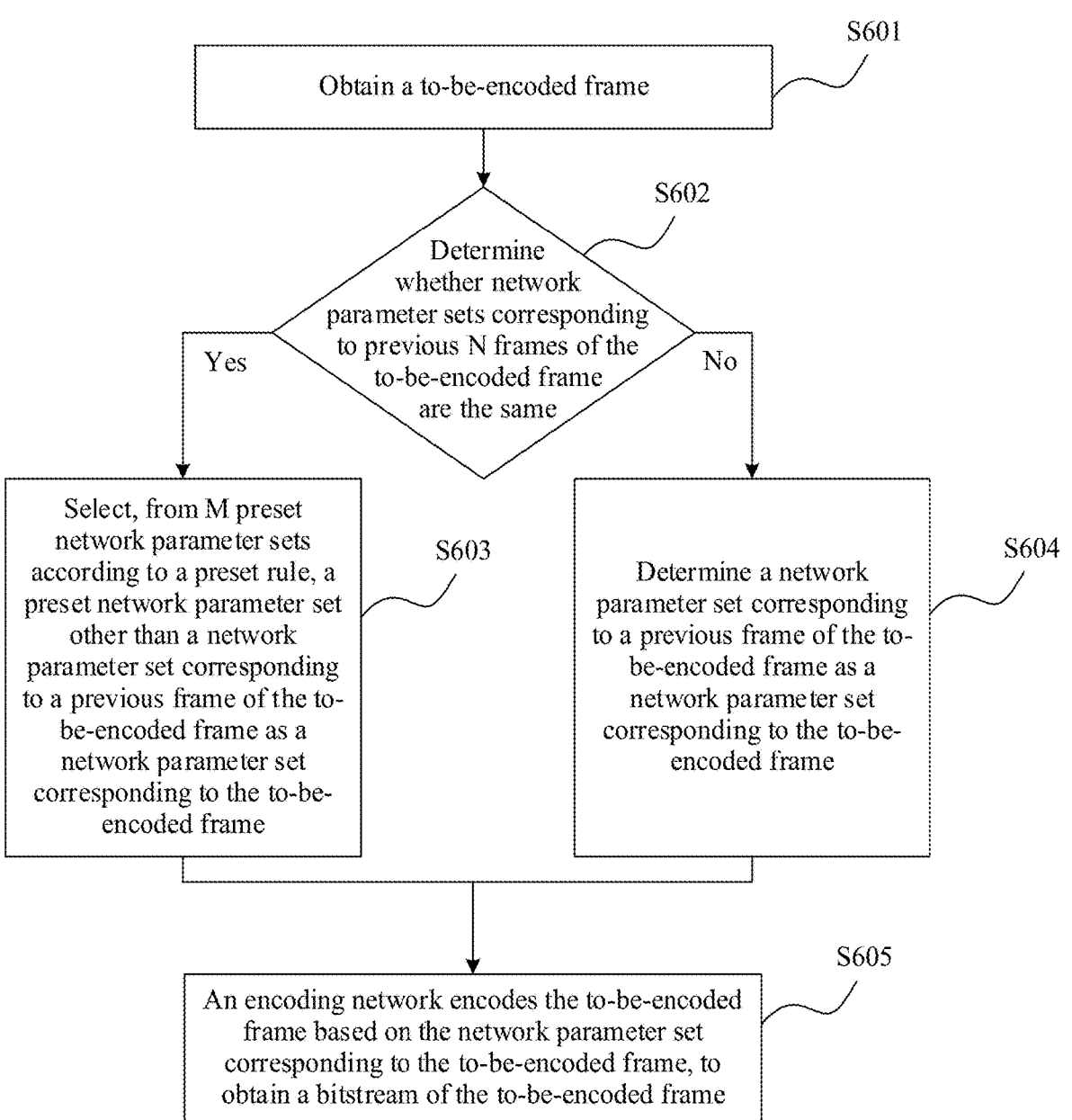
FIG. 6 is a diagram of an example of an encoding procedure.

FIG. 6 is a diagram of an example of an encoding procedure. In an embodiment of FIG. 6, an encoding network may encode N (N is an integer greater than 1) consecutive P-frames by using a same network parameter set.

S601: Obtain a to-be-encoded frame.

For example, after the to-be-encoded frame is obtained, when it is determined that the to-be-encoded frame is a P-frame, S602 to S605 may be performed to encode the to-be-encoded frame.

S602: Determine whether network parameter sets corresponding to previous N frames of the to-be-encoded frame are the same.

For example, in this disclosure, the N consecutive P-frames may be encoded by using the same network parameter set. In this example, N may be set based on a requirement, for example, N=3. A value of N is not limited in this disclosure. Further, it may be determined whether the network parameter sets corresponding to the previous N frames of the to-be-encoded frame are the same. When the network parameter sets corresponding to the previous N frames of the to-be-encoded frame are the same, S603 may be performed. In the network parameter sets corresponding to the previous N frames of the to-be-encoded frame, when a network parameter set corresponding to at least one frame is different from a network parameter set corresponding to another frame, S604 may be performed.

S603: Select, from M preset network parameter sets according to a preset rule, a preset network parameter set other than a network parameter set corresponding to a previous frame adjacent to the to-be-encoded frame as a network parameter set corresponding to the to-be-encoded frame.

For example, the preset rule may be preset, and may be set based on a requirement. This is not limited in this disclosure. For example, k(i)=k(i−1)+1, where k(i) is a sequence number of the network parameter set corresponding to the to-be-encoded frame, k(i−1) is a sequence number of the network parameter set corresponding to the previous frame adjacent to the to-be-encoded frame, and numbers of the M preset network parameter sets may be 1 to M.

Further, when network parameter sets corresponding to previous N frames of the to-be-encoded frame are the same, a preset network parameter set other than a network parameter set corresponding to a previous frame adjacent to the to-be-encoded frame may be selected, from the M preset network parameter sets according to a preset rule, as the network parameter set corresponding to the to-be-encoded frame.

For example, it is assumed that M=5, that is, five preset network parameter sets are included: a preset network parameter set 1, a preset network parameter set 2, a preset network parameter set 3, a preset network parameter set 4, and a preset network parameter set 5. If N=3, and network parameter sets corresponding to previous three frames of the to-be-encoded frame are the preset network parameter set 2, the preset network parameter set 3 is selected as the network parameter set corresponding to the to-be-encoded frame.

S604: Determine a network parameter set corresponding to a previous frame adjacent to the to-be-encoded frame as a network parameter set corresponding to the to-be-encoded frame.

For example, in the network parameter sets respectively corresponding to the previous N frames of the to-be-encoded frame, when a network parameter set corresponding to at least one frame is different from a network parameter set corresponding to another frame, the network parameter set corresponding to the previous frame adjacent to the to-be-encoded frame may be used as the network parameter set corresponding to the to-be-encoded frame.

For example, based on the foregoing example, if the network parameter sets corresponding to the previous three frames of the to-be-encoded frame are respectively the preset network parameter set 1, the preset network parameter set 1, and the preset network parameter set 2, the preset network parameter set 2 may be determined as the network parameter set corresponding to the to-be-encoded frame.

S605: The encoding network encodes the to-be-encoded frame based on the network parameter set corresponding to the to-be-encoded frame, to obtain a bitstream of the to-be-encoded frame.

For example, an AI encoding unit in the encoding network may load the network parameter set corresponding to the to-be-encoded frame, and then a reconstructed image of a previous frame adjacent to the to-be-encoded frame and the to-be-encoded frame may be input into the AI encoding unit, and the AI encoding unit performs processing to obtain intermediate data. Then, an entropy encoding unit in the encoding network performs entropy encoding on the intermediate data to obtain the bitstream of the to-be-encoded frame.

FIG. 7 is a diagram of an example of a decoding procedure. In an embodiment of FIG. 7, a decoding procedure corresponding to the encoding procedure in FIG. 6 is described.

S701: Obtain a bitstream of a to-be-decoded frame.

For example, after the bitstream of the to-be-decoded frame is obtained, the bitstream of the to-be-decoded frame may be parsed to determine whether the to-be-decoded frame is a P-frame. When the to-be-decoded frame is a P-frame, S702 to S705 may be performed to decode the bitstream of the to-be-decoded frame.

S702: Determine whether network parameter sets corresponding to previous N frames of the to-be-decoded frame are the same.

For example, an encoder side encodes N consecutive P-frames by using a same network parameter set. Therefore, after receiving the bitstream, a decoder side may determine whether the network parameter sets corresponding to the previous N frames of the to-be-decoded frame are the same. When the network parameter sets corresponding to the previous N frames of the to-be-decoded frame are the same, S703 may be performed. In the network parameter sets corresponding to the previous N frames of the to-be-decoded frame, when a network parameter set corresponding to at least one frame is different from a network parameter set corresponding to another frame, S704 may be performed.

S703: Select, from M preset network parameter sets according to a preset rule, a preset network parameter set other than a network parameter set corresponding to a previous frame adjacent to the to-be-decoded frame, and determine the preset network parameter set as a network parameter set corresponding to the to-be-decoded frame.

For example, when it is determined that network parameter sets respectively corresponding to previous N frames of the to-be-decoded frame are the same, a preset network parameter set other than a network parameter set corresponding to a previous frame adjacent to the to-be-decoded frame may be selected, from the M preset network parameter sets according to a preset rule, as the network parameter set corresponding to the to-be-decoded frame.

For example, it is assumed that M=5, that is, five preset network parameter sets are included: a preset network parameter set 1, a preset network parameter set 2, a preset network parameter set 3, a preset network parameter set 4, and a preset network parameter set 5. If N=3, and network parameter sets respectively corresponding to previous three frames of the to-be-decoded frame are the preset network parameter set 2, the preset network parameter set 3 may be selected as the network parameter set corresponding to the to-be-decoded frame.

S704: Determine a network parameter set corresponding to a previous frame adjacent to the to-be-decoded frame as a network parameter set corresponding to the to-be-decoded frame.

For example, when it is determined that in the network parameter sets respectively corresponding to the previous N frames of the to-be-decoded frame, a network parameter set corresponding to at least one frame is different from a network parameter set corresponding to another frame, the network parameter set corresponding to the previous frame adjacent to the to-be-decoded frame may be determined as the network parameter set corresponding to the to-be-decoded frame.

For example, based on the foregoing example, if the network parameter sets corresponding to the previous three frames of the to-be-decoded frame are respectively the preset network parameter set 1, the preset network parameter set 1, and the preset network parameter set 2, the preset network parameter set 2 may be determined as the network parameter set corresponding to the to-be-decoded frame.

S705: A decoding network decodes the bitstream of the to-be-decoded frame based on the network parameter set corresponding to the to-be-decoded frame, to obtain a reconstructed image of the to-be-decoded frame.

For example, an entropy decoding unit included in the decoding network may perform entropy decoding on the bitstream of the to-be-decoded frame to obtain intermediate data. Then, an AI decoding unit included in the decoding network loads the network parameter set corresponding to the to-be-decoded frame, and inputs a reconstructed image of the previous frame adjacent to the to-be-decoded frame and the intermediate data to the AI decoding unit. The AI decoding unit performs processing and outputs the reconstructed image of the to-be-decoded frame.

Figure 8:
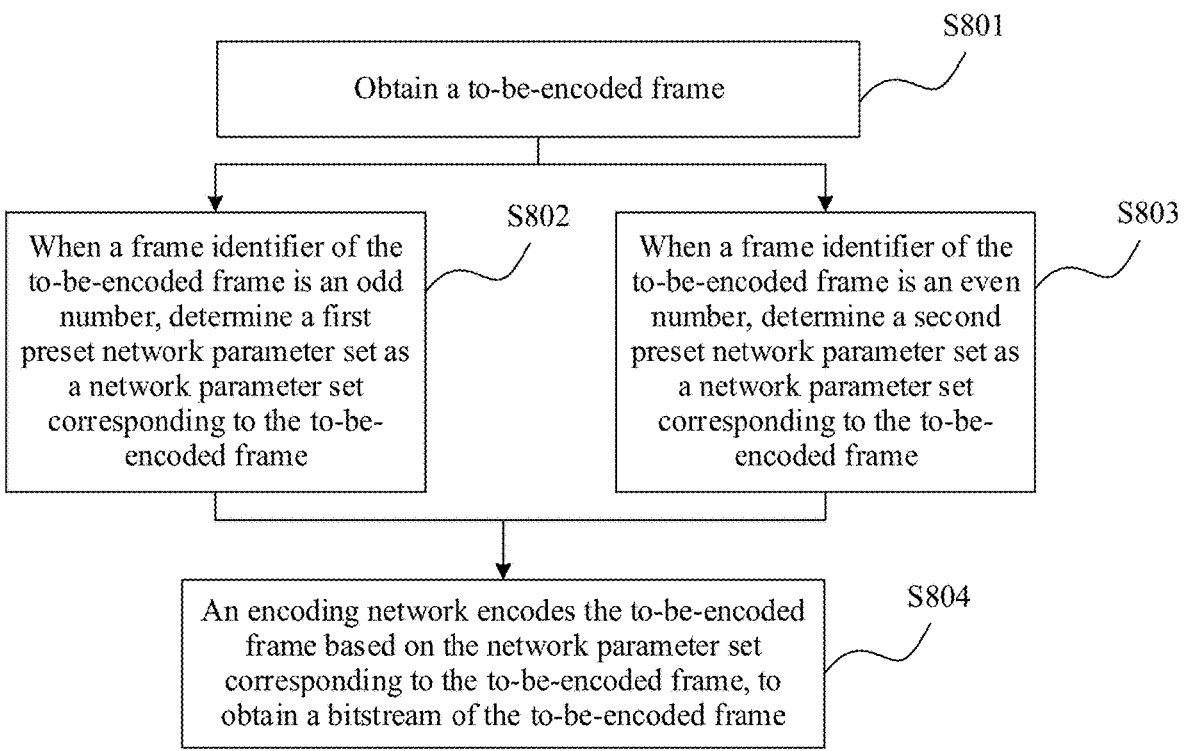
FIG. 8 is a diagram of an example of an encoding procedure.

FIG. 8 is a diagram of an example of an encoding procedure. In an embodiment in FIG. 8, M=2, that is, an encoding network includes two preset network parameter sets, and the encoding network may encode two adjacent P-frames by using different network parameter sets.

S801: Obtain a to-be-encoded frame.

For example, after the to-be-encoded frame is obtained, and it is determined that the to-be-encoded frame is a P-frame, whether a frame identifier of the to-be-encoded frame is an odd number or an even number may be determined. When it is determined that the frame identifier of the to-be-encoded frame is an odd number, S802 may be performed; or when it is determined that the frame identifier of the to-be-encoded frame is an even number, S803 may be performed.

For example, the frame identifier of the to-be-encoded frame may be a POC (Picture Order Count) value, or may be a frame sequence number of the to-be-encoded frame. This is not limited in this disclosure.

S802: When the frame identifier of the to-be-encoded frame is an odd number, determine a first preset network parameter set as a network parameter set corresponding to the to-be-encoded frame.

S803: When the frame identifier of the to-be-encoded frame is an even number, determine a second preset network parameter set as a network parameter set corresponding to the to-be-encoded frame.

For example, the encoding network may include two preset network parameter sets: a first preset network parameter set and a second preset network parameter set. When the frame identifier of the to-be-encoded frame is an odd number, the first preset network parameter set may be determined as the network parameter set corresponding to the to-be-encoded frame. When the frame identifier of the to-be-encoded frame is an even number, the second preset network parameter set may be determined as the network parameter set corresponding to the to-be-encoded frame.

It should be understood that, when the frame identifier of the to-be-encoded frame is an odd number, the second preset network parameter set may alternatively be determined as the network parameter set corresponding to the to-be-encoded frame; or when the frame identifier of the to-be-encoded frame is an even number, the first preset network parameter set may alternatively be determined as the network parameter set corresponding to the to-be-encoded frame. In other words, whether the encoding network encodes the to-be-encoded frame whose frame identifier is an odd number by using the first preset network parameter set or encodes the to-be-encoded frame whose frame identifier is an odd number by using the second preset network parameter set is not limited in this disclosure.

In a possible manner, compression performance information corresponding to the first preset network parameter set is higher than compression performance information corresponding to the second preset network parameter set.

In a possible manner, compression performance information corresponding to the second preset network parameter set is higher than compression performance information corresponding to the first preset network parameter set.

For example, when the compression performance information includes image quality, the image quality corresponding to the first preset network parameter set is higher than the image quality corresponding to the second preset network parameter set; or the image quality corresponding to the second preset network parameter set is higher than the image quality corresponding to the first preset network parameter set.

For example, when the compression performance information includes a compression rate, the compression rate corresponding to the first preset network parameter set is higher than the compression rate corresponding to the second preset network parameter set; or the compression rate corresponding to the second preset network parameter set is higher than the compression rate corresponding to the first preset network parameter set.

For example, when the compression performance information includes image quality and a compression rate, the image quality corresponding to the first preset network parameter set is higher than the image quality corresponding to the second preset network parameter set, and the compression rate corresponding to the first preset network parameter set is higher than the compression rate corresponding to the second preset network parameter set. Alternatively, the image quality corresponding to the second preset network parameter set is higher than the image quality corresponding to the first preset network parameter set, and the compression rate corresponding to the second preset network parameter set is higher than the compression rate corresponding to the first preset network parameter set.

S804: The encoding network encodes the to-be-encoded frame based on the network parameter set corresponding to the to-be-encoded frame, to obtain a bitstream of the to-be-encoded frame.

For example, for S804, refer to the description of S605. Details are not described herein again.

Figure 9:
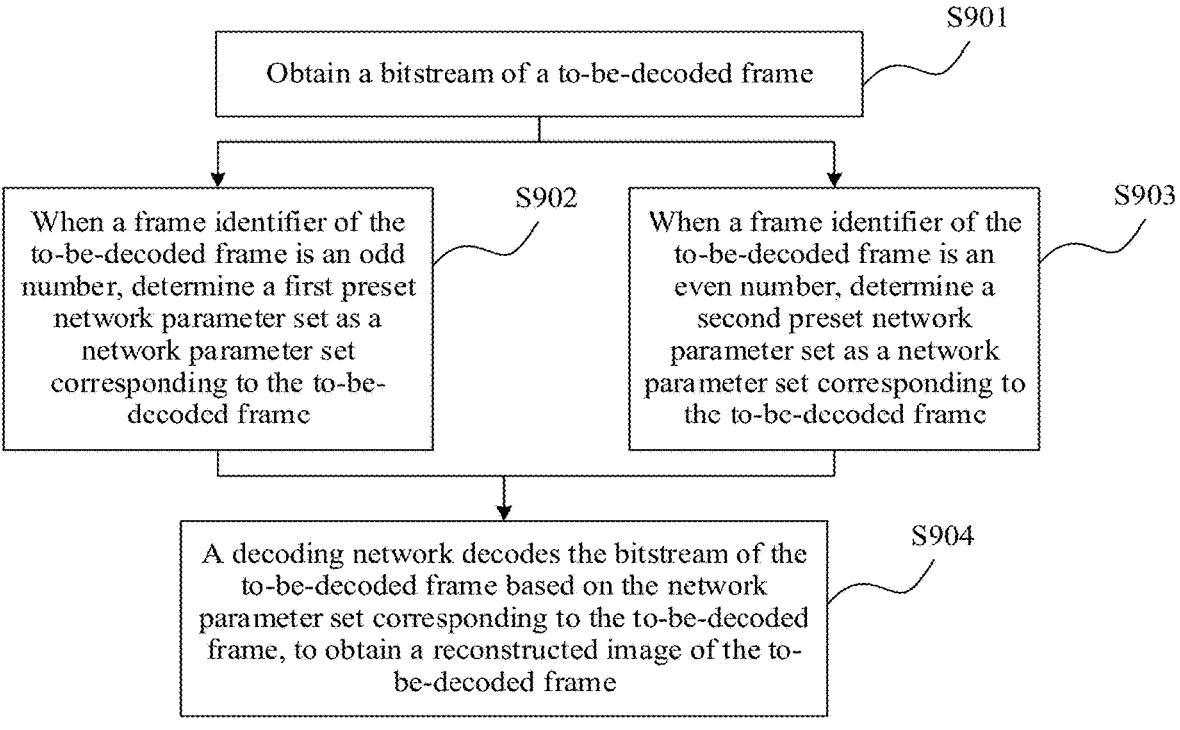
FIG. 9 is a diagram of an example of a decoding procedure.

FIG. 9 is a diagram of an example of a decoding procedure. In an embodiment of FIG. 9, a decoding method corresponding to the encoding method in FIG. 8 is described, that is, M=2, and a decoding network includes two preset network parameter sets, and the decoding network may decode two adjacent P-frames by using different network parameter sets.

S901: Obtain a bitstream of a to-be-decoded frame.

For example, after the bitstream of the to-be-decoded frame is obtained, the bitstream of the to-be-decoded frame may be parsed, and a frame identifier and a frame type of the to-be-decoded frame are obtained from the bitstream of the to-be-decoded frame. Then, when it is determined that the to-be-decoded frame is a P-frame and the frame identifier is an odd number, S902 is performed; or when it is determined that the to-be-decoded frame is a P-frame and the frame identifier is an even number, S903 is performed.

S902: When the frame identifier of the to-be-decoded frame is an odd number, determine a first preset network parameter set as a network parameter set corresponding to the to-be-decoded frame.

S903: When the frame identifier of the to-be-decoded frame is an even number, determine a second preset network parameter set as a network parameter set corresponding to the to-be-decoded frame.

For example, the decoding network may include two preset network parameter sets: a first preset network parameter set and a second preset network parameter set. When the frame identifier of the to-be-decoded frame is an odd number, the first preset network parameter set may be determined as the network parameter set corresponding to the to-be-decoded frame. When the frame identifier of the to-be-decoded frame is an even number, the second preset network parameter set may be determined as the network parameter set corresponding to the to-be-decoded frame.

It should be understood that, when the frame identifier of the to-be-decoded frame is an odd number, the second preset network parameter set may alternatively be determined as the network parameter set corresponding to the to-be-decoded frame; or when the frame identifier of the to-be-decoded frame is an even number, the first preset network parameter set may alternatively be determined as the network parameter set corresponding to the to-be-decoded frame. That is, whether the decoding network decodes the to-be-decoded frame whose frame identifier is an odd number by using the first preset network parameter set or decodes the to-be-decoded frame whose frame identifier is an odd number by using the second preset network parameter set is not limited in this disclosure, as long as this corresponds to the encoding network.

In a possible manner, compression performance information corresponding to the first preset network parameter set is higher than compression performance information corresponding to the second preset network parameter set.

In a possible manner, compression performance information corresponding to the second preset network parameter set is higher than compression performance information corresponding to the first preset network parameter set.

S904: The decoding network decodes the bitstream of the to-be-decoded frame based on the network parameter set corresponding to the to-be-decoded frame, to obtain a reconstructed image of the to-be-decoded frame.

For example, for S904, refer to the description of S705. Details are not described herein again.

Figure 10:
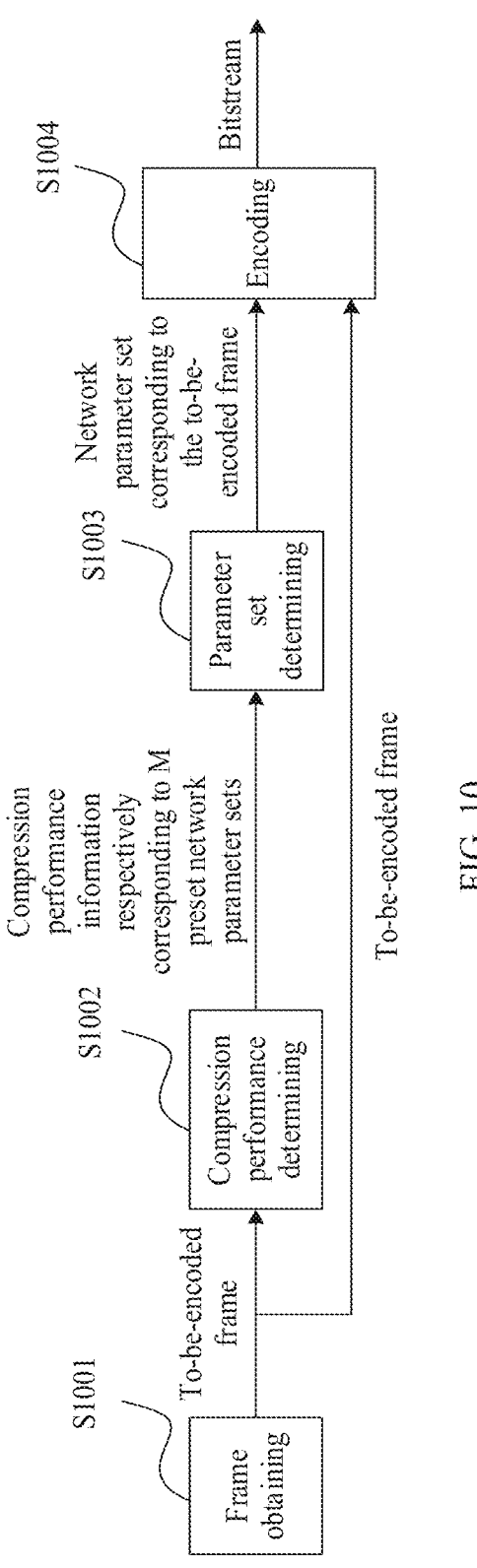
FIG. 10 is a diagram of an example of an encoding procedure.

FIG. 10 is a diagram of an example of an encoding procedure. In an embodiment of FIG. 10, an encoding network may select, based on compression performance information corresponding to each preset network parameter set, a network parameter set used for encoding a to-be-encoded frame.

S1001: Obtain a to-be-encoded frame.

S1002: Determine compression performance information respectively corresponding to M preset network parameter sets.

The following uses determining compression performance information corresponding to an $i^{th}$ preset network parameter set as an example for description.

Refer to FIG. 5A. For example, the encoding network loads an $i^{th}$ preset network parameter set, and then may input the to-be-encoded frame and a reconstructed image of a reference frame of the to-be-encoded frame into the inter transformation network, to obtain to-be-compressed information that is of inter side information and that is output by the inter transformation network. Then, the to-be-compressed information of the inter side information is input into the inter inverse transformation network, to obtain inter side information output by the inter inverse transformation network. Then, the reconstructed image of the reference frame of the to-be-encoded frame and the inter side information are input into the prediction network, to obtain prediction information output by the prediction network. Then, residual information is determined based on the to-be-encoded frame and the prediction information, and the residual information is input into the residual transformation network to obtain to-be-compressed information of the residual information output by the residual transformation network. For example, a same device may include an encoding network and a decoding network. Refer to FIG. 5B. In this way, the decoding network may load an $i^{th}$ preset network parameter set, and then may input the to-be-compressed information of the residual information into the residual inverse transformation network, to obtain residual information output by the residual inverse transformation network. Then, reconstruction may be performed based on the prediction information and the residual information, to obtain the reconstructed image. For example, the to-be-encoded frame may be compared with a reconstructed image of the to-be-encoded frame, to determine compression performance information (for example, a PSNR (Peak Signal to Noise Ratio), or bpp), that is, the compression performance information corresponding to the $i^{th}$ preset network parameter set. In this way, the compression performance information respectively corresponding to the M preset network parameter sets can be obtained.

S1003: Determine, from the M preset network parameter sets based on the compression performance information respectively corresponding to the M preset network parameter sets, a network parameter set corresponding to the to-be-encoded frame.

For example, the encoding network may encode K consecutive P-frames by using the same network parameter set with compression performance information lower than a threshold (K is an integer, and K and N may be equal or different, which is not limited in this disclosure), and encode subsequent K consecutive P-frames by using the same network parameter set with compression performance information higher than the threshold. The threshold may be set based on a requirement. This is not limited in this disclosure.

Further, if compression performance information corresponding to previous K frames of the to-be-encoded frame is higher than the threshold, a preset network parameter set whose corresponding compression performance information is lower than the threshold may be used as the network parameter set corresponding to the to-be-encoded frame. If compression performance information corresponding to previous K frames of the to-be-encoded frame is lower than the threshold, a preset network parameter set whose corresponding compression performance information is higher than the threshold is used as the network parameter set corresponding to the to-be-encoded frame.

Alternatively, if compression performance information corresponding to a previous frame adjacent to the to-be-encoded frame is lower than the threshold, a preset network parameter set corresponding to compression performance information lower than the threshold is used as the network parameter set corresponding to the to-be-encoded frame. If compression performance information corresponding to a previous frame adjacent to the to-be-encoded frame is higher than the threshold, a preset network parameter set corresponding compression performance information higher than the threshold is used as the network parameter set corresponding to the to-be-encoded frame.

For example, it is assumed that M=5, that is, five preset network parameter sets are included: a preset network parameter set 1, a preset network parameter set 2, a preset network parameter set 3, a preset network parameter set 4, and a preset network parameter set 5. Compression performance information corresponding to the preset network parameter set 1 and the preset network parameter set 2 is higher than the threshold, and compression performance information corresponding to the preset network parameter set 3, the preset network parameter set 4, and the preset network parameter set 5 is lower than the threshold. It is assumed that K=2, if preset network parameter sets corresponding to previous two frames of the to-be-encoded frame are the preset network parameter set 2, the preset network parameter set 3, the preset network parameter set 4, or the preset network parameter set 5 is selected as the network parameter set corresponding to the to-be-encoded frame. If preset network parameter sets corresponding to previous two frames of the to-be-encoded frame are the preset network parameter set 5, the preset network parameter set 1 or the preset network parameter set 2 is selected as the network parameter set corresponding to the to-be-encoded frame. If preset network parameter sets corresponding to previous two frames of the to-be-encoded frame are respectively the preset network parameter set 2 and the preset network parameter set 3, the preset network parameter set 3 or the preset network parameter set 4 or the preset network parameter set 5 is selected as the network parameter set corresponding to the to-be-encoded frame. If preset network parameter sets corresponding to previous two frames of the to-be-encoded frame are respectively the preset network parameter set 3 and the preset network parameter set 1, the preset network parameter set 1 or the preset network parameter set 2 is selected as the network parameter set corresponding to the to-be-encoded frame.

S1004: The encoding network encodes the to-be-encoded frame based on the network parameter set corresponding to the to-be-encoded frame, to obtain a bitstream of the to-be-encoded frame.

For example, in S1002, the encoding network has loaded the network parameter set to encode the to-be-encoded frame, to obtain to-be-compressed information (that is, to-be-compressed information of inter side information and to-be-compressed information of residual information) of intermediate data of the to-be-encoded frame. In this case, the encoding network may perform entropy encoding on the to-be-compressed information of the intermediate data obtained by loading the network parameter set for encoding the to-be-encoded frame, to obtain the bitstream of the to-be-encoded frame.

For example, in the M preset network parameter sets corresponding to the encoding network, each preset network parameter set has a corresponding set identifier, and each set identifier is used to uniquely identify one preset network parameter set. After the bitstream of the to-be-encoded frame is obtained, the set identifier of the network parameter set may be added to the bitstream of the to-be-encoded frame, so that a decoder side performs decoding by using the corresponding network parameter set.

Figure 11:
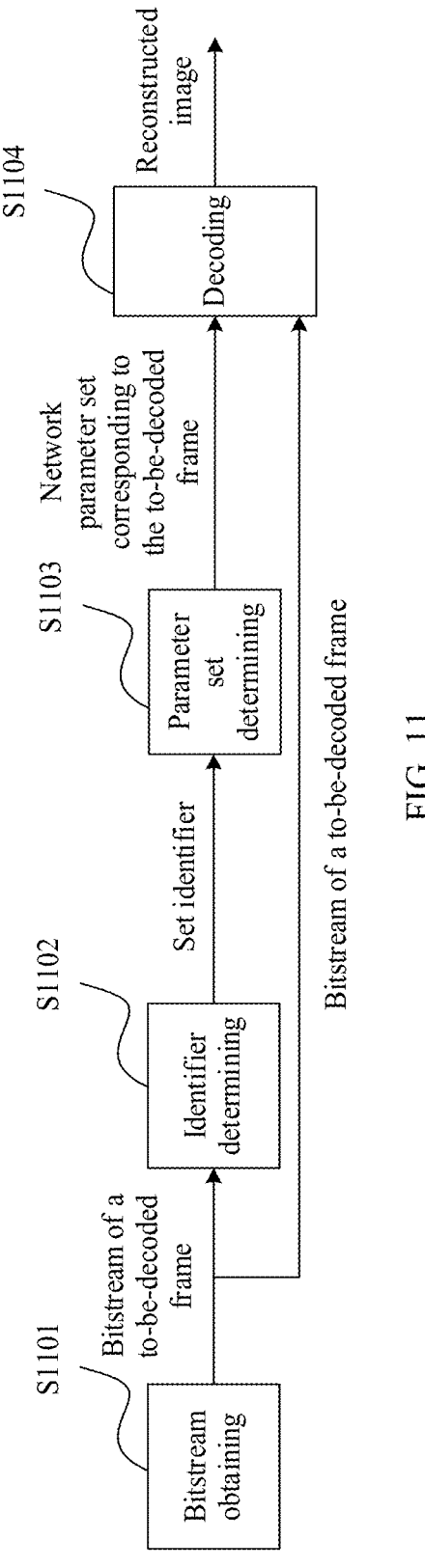
FIG. 11 is a diagram of an example of a decoding procedure.

FIG. 11 is a diagram of an example of a decoding procedure. In an embodiment of FIG. 11, the decoding procedure corresponding to the encoding procedure in FIG. 10 is described.

S1101: Obtain a bitstream of a to-be-decoded frame.

S1102: Parse the bitstream of the to-be-decoded frame to obtain a set identifier.

S1103: Determine a preset network parameter set, in the M preset network parameter sets, matching the set identifier as a network parameter set corresponding to the to-be-decoded frame.

For example, in the M preset network parameter sets corresponding to a decoding network, each preset network parameter set has a corresponding set identifier, and each set identifier is used to uniquely identify one preset network parameter set. After the bitstream of the to-be-decoded frame is obtained, the bitstream of the to-be-decoded frame may be parsed to obtain the set identifier. Then, the M preset network parameter sets corresponding to the decoding network are searched for the preset network parameter set matching the set identifier; and then the preset network parameter set matching the set identifier is determined as the network parameter set corresponding to the to-be-decoded frame.

S1104: The decoding network decodes the bitstream of the to-be-decoded frame based on the network parameter set corresponding to the to-be-decoded frame, to obtain a reconstructed image of the to-be-decoded frame.

For example, for S1104, refer to the description of S705. Details are not described herein again.

It should be understood that, in the embodiment in FIG. 6, after the bitstream of the to-be-encoded frame is obtained, a set identifier of a network parameter set corresponding to the to-be-encoded frame may also be added to the bitstream of the to-be-encoded frame. In this way, after an encoder side receives the bitstream of the to-be-decoded frame, decoding may be performed with reference to S1101 to S1104.

It should be understood that, in the embodiment of FIG. 8, after the bitstream of the to-be-encoded frame is obtained, a set identifier of a network parameter set corresponding to the to-be-encoded frame may also be added to the bitstream of the to-be-encoded frame. In this way, after an encoder side receives the bitstream of the to-be-decoded frame, decoding may be performed with reference to S1101 to S1104.

Figure 12A:
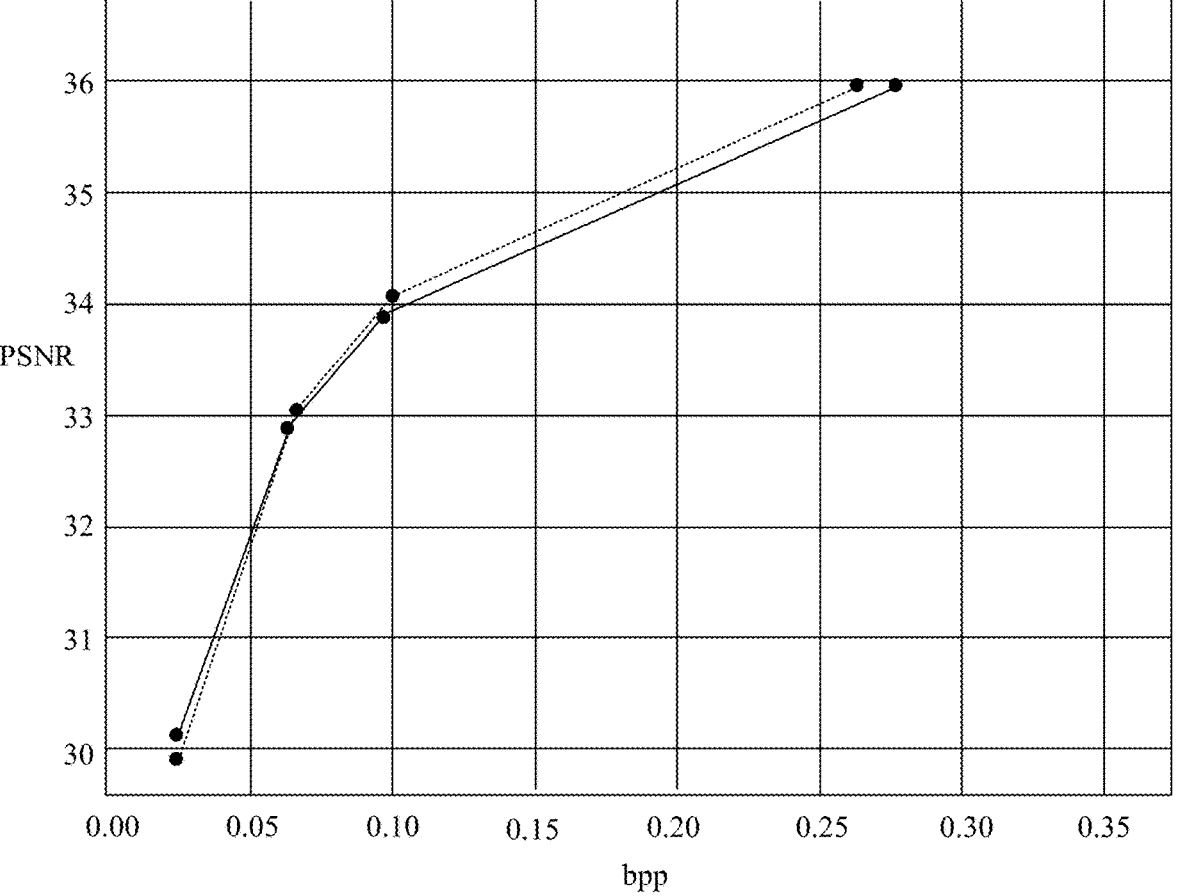
FIG. 12A is a diagram of an example of compression performance effect.

FIG. 12A is a diagram of an example of compression performance effect.

Refer to FIG. 12A, a solid line is a compression performance effect curve corresponding to other technology, and a dashed line is a compression performance effect curve corresponding to this disclosure. A higher PSNR value indicates higher image quality, and a larger bpp value indicates a lower compression rate. Through comparison, when compression rate values are the same, the PSNR value in this disclosure is higher; or when PSNR values are the same, the bpp value in this disclosure is smaller.

Figure 12B:
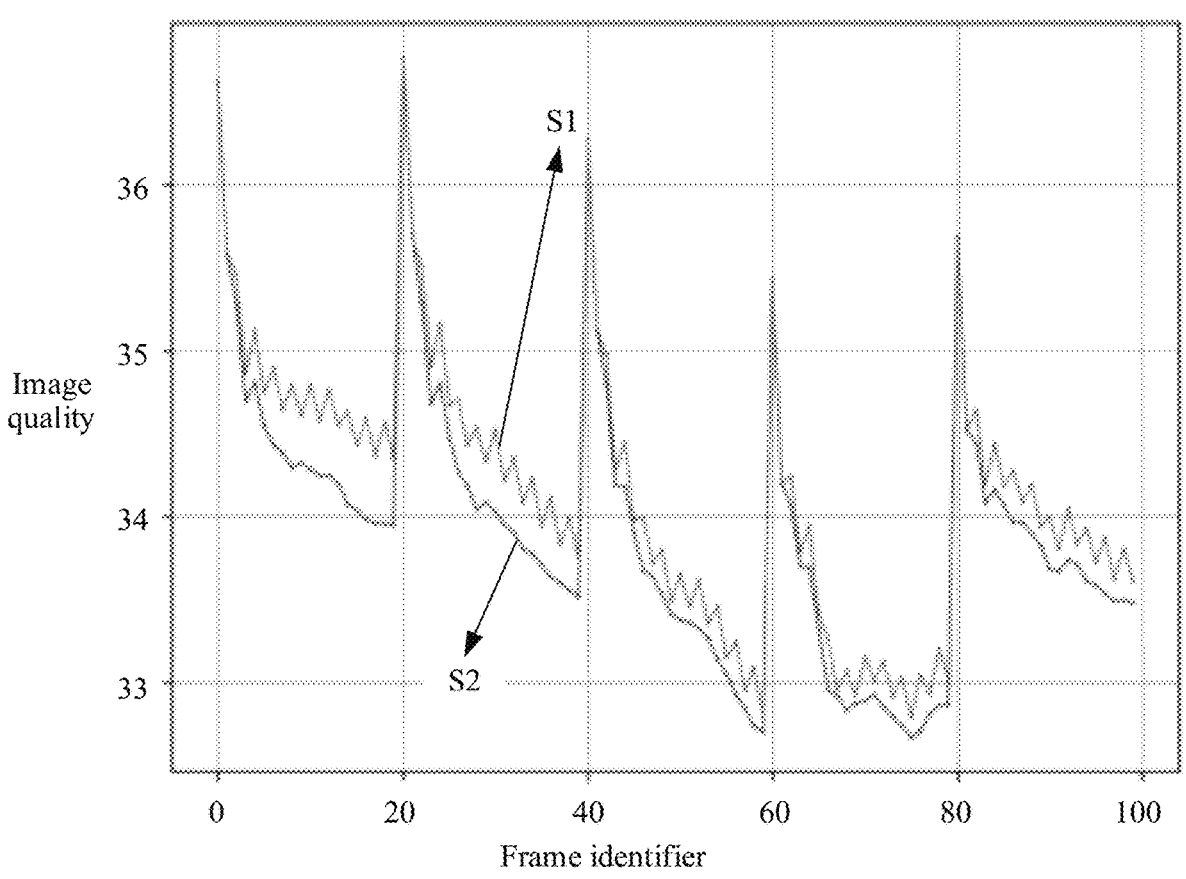
FIG. 12B is a diagram of an example of image quality.

FIG. 12B is a diagram of an example of image quality.

Refer to FIG. 12B, S2 is an image quality curve corresponding to other technology, and S1 is an image quality curve corresponding to this disclosure. Through comparison, image quality of frames in this disclosure has adversarial characteristics, and the frames have higher image quality.

Figure 13:
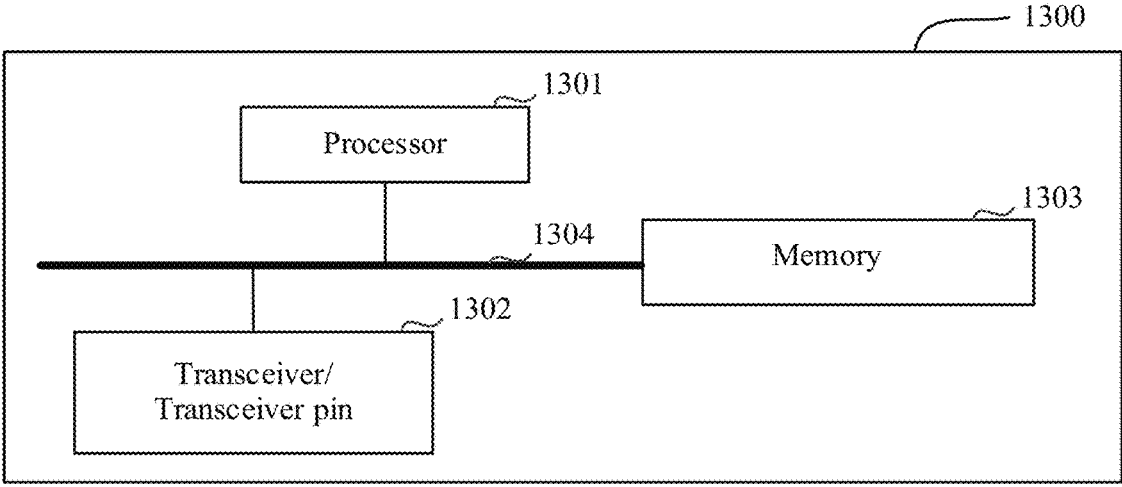
FIG. 13 is a diagram of a structure of an example of an apparatus.

In an example, FIG. 13 is a block diagram of an apparatus 1300 according to an embodiment of this disclosure. The apparatus 1300 may include a processor 1301 and a transceiver/transceiver pin 1302, and optionally, further include a memory 1303.

Components of the apparatus 1300 are coupled together through a bus 1304. In addition to a data bus, the bus 1304 further includes a power bus, a control bus, and a status signal bus. However, for clear description, various buses are referred to as the bus 1304 in the figure.

Optionally, the memory 1303 may be configured to store instructions in the foregoing method embodiments. The processor 1301 may be configured to execute the instructions in the memory 1303, control a receiving pin to receive a signal, and control a sending pin to send a signal.

The apparatus 1300 may be the electronic device or a chip of the electronic device in the foregoing method embodiments.

All related content of the steps in the foregoing method embodiments may be cited in function descriptions of the corresponding functional modules. Details are not described herein again.

This embodiment further provides a computer storage medium. The computer storage medium stores computer instructions. When the computer instructions are run on an electronic device, the electronic device is enabled to perform the foregoing related method steps, to implement the encoding method and the decoding method and the training method in the foregoing embodiments.

An embodiment further provides a computer program product. When the computer program product runs on a computer, the computer is enabled to perform the foregoing related steps to implement the encoding method and the decoding method and the training method in the foregoing embodiments.

In addition, an embodiment of this disclosure further provides an apparatus. The apparatus may be for example, a chip, a component, or a module. The apparatus may include a processor and a memory that are connected. The memory is configured to store computer-executable instructions. When the apparatus runs, the processor may execute the computer-executable instructions stored in the memory, to enable the chip to perform the encoding method and the decoding method and the training method in the foregoing method embodiments.

The electronic device, the computer storage medium, the computer program product, or the chip provided in this embodiment is configured to perform the corresponding method provided above. Therefore, for beneficial effect that can be achieved, refer to the beneficial effect of the corresponding method provided above. Details are not described herein again.

Based on the foregoing descriptions of the implementations, a person skilled in the art may understand that for the purpose of convenient and brief description, division into the foregoing functional modules is merely used as an example for descriptions. During actual application, the foregoing functions can be allocated to different functional modules for implementation based on a requirement, that is, an inner structure of an apparatus is divided into different functional modules to implement all or a part of the functions described above.

In the several embodiments provided in this disclosure, it should be understood that the disclosed apparatus and method may be implemented in other manners. For example, the described apparatus embodiments are merely examples. For example, the division into modules or units is merely logical function division, and may be other division during actual implementation. For example, a plurality of units or components may be combined or integrated into another apparatus, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or another form.

The units described as separate parts may or may not be physically separate, and parts displayed as units may be one or more physical units, may be located in one place, or may be distributed on different places. Some or all of the units may be selected based on actual requirements to achieve the objectives of the solutions of embodiments.

In addition, functional units in embodiments of this disclosure may be integrated into one processing unit, or each of the units may exist alone physically, or two or more units are integrated into one unit. The integrated unit may be implemented in a form of hardware, or may be implemented in a form of a software functional unit.

Any content in embodiments of this disclosure and any content in a same embodiment can be freely combined. Any combination of the foregoing content falls within the scope of this disclosure.

When the integrated unit is implemented in the form of a software functional unit and sold or used as an independent product, the integrated unit may be stored in a readable storage medium. Based on such an understanding, the technical solutions in embodiments of this disclosure, or the part contributing to other technology, or all or some of the technical solutions may be implemented in the form of a software product. The software product is stored in a storage medium and includes several instructions for instructing a device (which may be a single-chip microcomputer, a chip or the like) or a processor to perform all or some of the steps of the methods described in embodiments of this disclosure. The foregoing storage medium includes any medium that can store program code, such as a Universal Serial Bus (USB) flash drive, a removable hard disk, a read only memory (ROM), a random access memory (RAM), a magnetic disk, or an optical disc.

The foregoing describes embodiments of this disclosure with reference to the accompanying drawings. However, this disclosure is not limited to the foregoing specific implementations. The foregoing specific implementations are merely examples, and are not limitative. Inspired by this disclosure, a person of ordinary skill in the art may further make many modifications without departing from the purposes of this disclosure and the protection scope of the claims, and all the modifications shall fall within the protection scope of this disclosure.

Methods or algorithm steps described in combination with the content disclosed in this embodiment of this disclosure may be implemented by hardware, or may be implemented by a processor by executing a software instruction. The software instruction may include a corresponding software module. The software module may be stored in RAM, a flash memory, ROM, Erasable Programmable ROM (EPROM), an electrically erasable programmable read only memory (Electrically EPROM, EEPROM), a register, a hard disk, a mobile hard disk, a compact disc read-only memory (CD-ROM), or any other form of storage medium well-known in the art. For example, a storage medium is coupled to a processor, so that the processor can read information from the storage medium and write information into the storage medium. The storage medium may be a component of the processor. The processor and the storage medium may be disposed in an Application Specific Integrated Circuit (ASIC).

A person skilled in the art should be aware that in the foregoing one or more examples, functions described in embodiments of this disclosure may be implemented by hardware, software, firmware, or any combination thereof. When the functions are implemented by software, the foregoing functions may be stored in a computer-readable medium or transmitted as one or more instructions or code in a computer-readable medium. The computer-readable medium includes a computer storage medium and a communication medium, where the communication medium includes any medium that enables a computer program to be transmitted from one place to another. The storage medium may be any available medium accessible to a general-purpose or a dedicated computer.

The foregoing describes embodiments of this disclosure with reference to the accompanying drawings. However, this disclosure is not limited to the foregoing specific implementations. The foregoing specific implementations are merely examples, and are not limitative. Inspired by this disclosure, a person of ordinary skill in the art may further make many modifications without departing from the purposes of this disclosure and the protection scope of the claims, and all the modifications shall fall within the protection scope of this disclosure.

What is claimed is:

1. An encoding method comprising:

obtaining a to-be-encoded frame, wherein the to-be-encoded frame is a P-frame;

selecting, from M preset network parameter sets, a preset network parameter set corresponding to the to-be-encoded frame, wherein the M preset network parameter sets respectively correspond to different compression performance information, wherein M is an integer greater than one, and wherein selecting the preset network parameter set corresponding to the to-be-encoded frame comprises:

selecting, according to a preset rule and when the M preset network parameter sets corresponding to N previous frames are the same as a network parameter set of the to-be-encoded frame, a first preset network parameter set other than a second network parameter set corresponding to a previous frame adjacent to the to-be-encoded frame as the network parameter set corresponding to the to-be-encoded frame; and selecting, when the M preset network parameter sets corresponding to the N previous frames differ from the network parameter set of the to-be-encoded frame, the second network parameter set as the network parameter set corresponding to the to-be-encoded frame, wherein N is an integer greater than one; and encoding the to-be-encoded frame based on the preset network parameter set to obtain a bitstream.

2. The encoding method of claim 1, wherein M is equal to two, wherein the M preset network parameter sets comprise a first preset network parameter set and a second preset network parameter set, wherein the encoding method further comprises:

selecting the first preset network parameter set as the network parameter set corresponding to the to-be-encoded frame when a frame identifier of the to-be-encoded frame is an odd number; and selecting the second preset network parameter set as the network parameter set corresponding to the to-be-encoded frame when the frame identifier of the to-be-encoded frame is an even number.

3. The encoding method of claim 2, wherein first compression performance information corresponding to the first preset network parameter set is higher than second compression performance information corresponding to the second preset network parameter set, or wherein the second compression performance information is higher than the first compression performance information.

4. The encoding method of claim 1, wherein selecting the preset network parameter set corresponding to the to-be-encoded frame comprises:

selecting the compression performance information respectively corresponding to the M preset network parameter sets; and selecting, based on the compression performance information respectively corresponding to the M preset network parameter sets, the network parameter set corresponding to the to-be-encoded frame.

5. The encoding method of claim 4, wherein selecting the preset network parameter set corresponding to the to-be-encoded frame comprises:

using a preset network parameter set whose corresponding compression performance information is lower than a threshold as the network parameter set corresponding to the to-be-encoded frame when compression performance information corresponding to previous K frames of the to-be-encoded frame is higher than the threshold, wherein K is a positive integer; and using a preset network parameter set whose corresponding compression performance information is higher than the threshold as the network parameter set corresponding to the to-be-encoded frame when the compression performance information corresponding to previous K frames of the to-be-encoded frame is lower than the threshold.

6. The encoding method of claim 5, wherein selecting the preset network parameter set corresponding to the to-be-encoded frame further comprises:

using a preset network parameter set whose corresponding compression performance information is lower than the threshold as the network parameter set corresponding to the to-be-encoded frame when compression performance information corresponding to a previous frame adjacent to the to-be-encoded frame is lower than the threshold; and using a preset network parameter set whose corresponding compression performance information is higher than the threshold as the network parameter set corresponding to the to-be-encoded frame when the compression performance information corresponding to the previous frame adjacent to the to-be-encoded frame is higher than the threshold.

7. The encoding method of claim 1, wherein each of the M preset network parameter sets comprises a plurality of preset network parameter groups, wherein the plurality of preset network parameter groups corresponds to a plurality of subnets of an encoding network, and wherein some preset network parameter groups in any two preset network parameter sets in the M preset network parameter sets differ.

8. The encoding method of claim 1, wherein the bitstream comprises a set identifier of the preset network parameter set corresponding to the to-be-encoded frame.

9. A decoding method comprising:

obtaining a bitstream of a to-be-decoded frame, wherein the to-be-decoded frame is a P-frame;

selecting, from M preset network parameter sets, a network parameter set corresponding to the to-be-decoded frame, wherein the M preset network parameter sets respectively correspond to different compression performance information, wherein M is equal to two, wherein the M preset network parameter sets comprise a first preset network parameter set and a second preset network parameter set, and wherein selecting a network parameter set corresponding to the to-be-decoded frame comprises:

selecting the first preset network parameter set as a network parameter set corresponding to the to-be-decoded frame when a frame identifier of the to-be-decoded frame is an odd number; and selecting the second preset network parameter set as the network parameter set corresponding to the to-be-decoded frame when the frame identifier of the to-be-decoded frame is an even number; and decoding, by a decoding network, and based on the network parameter set corresponding to the to-be-decoded frame, the bitstream, to obtain a reconstructed image of the to-be-decoded frame.

10. The decoding method of claim 9, wherein compression performance information corresponding to the first preset network parameter set is higher than compression performance information corresponding to the second preset network parameter set; or compression performance information corresponding to the second preset network parameter set is higher than compression performance information corresponding to the first preset network parameter set.

11. The decoding method of claim 9, wherein selecting a network parameter set corresponding to the to-be-decoded frame comprises:

parsing the bitstream of the to-be-decoded frame to obtain a set identifier; and matching the set identifier as the network parameter set corresponding to the to-be-decoded frame.

12. The decoding method of claim 9, wherein selecting a network parameter set corresponding to the to-be-decoded frame comprises:

selecting, according to a preset rule, and when the network parameter sets corresponding to N previous frames are the same as the network parameter set of the to-be-decoded frame, a first preset network parameter set other than a network parameter set corresponding to a previous frame adjacent to the to-be-decoded frame as the network parameter set corresponding to the to-be-decoded frame; and selecting, when the network parameter sets corresponding to the N previous frames differ from the network parameter set of the to-be-decoded frame, a network parameter set corresponding to a previous frame adjacent to the to-be-decoded frame as the network parameter set corresponding to the to-be-decoded frame, and wherein N is an integer greater than one.

13. The decoding method of claim 12, wherein the preset rule is adaptively updated based on decoding-performance information determined for a plurality of previously decoded frames.

14. The decoding method of claim 9, wherein determining the network parameter set corresponding to the to-be-decoded frame further comprises:

obtaining compression performance information corresponding to previously decoded frames; and further selecting the network parameter set based on the compression performance information.

15. A decoding system comprising:

a selector configured to determine, from M preset network parameter sets, a network parameter set corresponding to a bitstream of a to-be-decoded frame, wherein the to-be-decoded frame is a P-frame, the M preset network parameter sets respectively correspond to different compression performance information, wherein M is equal to two, wherein the M preset network parameter sets comprise a first preset network parameter set and a second preset network parameter set, and wherein the selector is further configured to select the first preset network parameter set as the network parameter set corresponding to the to-be-decoded frame when a frame identifier of the to-be-decoded frame is an odd number; and a decoding network configured to decode the bitstream of the to-be-decoded frame based on the network parameter set corresponding to the to-be-decoded frame, to obtain a reconstructed image of the to-be-decoded frame.

16. The decoding system of claim 15, wherein the selector is further configured to select the second preset network parameter set as the network parameter set corresponding to the to-be-decoded frame when a frame identifier of the to-be-decoded frame is an even number.

17. The decoding system of claim 15, wherein:

compression performance information corresponding to a first preset network parameter set is higher than compression performance information corresponding to a second preset network parameter set; or compression performance information corresponding to the second preset network parameter set is higher than compression performance information corresponding to the first preset network parameter set.

18. The decoding system of claim 15, wherein the selector is further configured to:

parse the bitstream of the to-be-decoded frame to obtain a set identifier; and match the set identifier as the network parameter set corresponding to the to-be-decoded frame.

19. The decoding system of claim 15, wherein the selector is further configured to select, according to a preset rule and when network parameter sets respectively corresponding to N previous frames of the to-be-decoded frame are the same, a preset network parameter set other than a network parameter set corresponding to a previous frame adjacent to the to-be-decoded frame as the network parameter set corresponding to the to-be-decoded frame, and wherein N is an integer greater than one.

20. The decoding system of claim 15, wherein the selector is further configured to select, when network parameter sets respectively corresponding to previous N frames of the to-be-decoded frame differ, a network parameter set corresponding to a previous frame adjacent to the to-be-decoded frame as the network parameter set corresponding to the to-be-decoded frame, and wherein N is an integer greater than one.

* * * * *